(12) United States Patent
Smith et al.

(10) Patent No.: US 7,139,128 B2
(45) Date of Patent: Nov. 21, 2006

(54) DIFFRACTION GRATING HAVING HIGH THROUGHPUT EFFICIENCY

(75) Inventors: Malcolm C. Smith, Winchester, MA (US); Richard S. Payne, Andover, MA (US)

(73) Assignee: Polychromix Corporation, Wilmington, DE (US)

( * ) Notice: Subject to any disclaimer, the term of this patent is extended or adjusted under 35 U.S.C. 154(b) by 40 days.

(21) Appl. No.: 10/752,308

(22) Filed: Jan. 6, 2004

(65) Prior Publication Data
US 2005/0088744 A1    Apr. 28, 2005

Related U.S. Application Data

(60) Provisional application No. 60/438,147, filed on Jan. 6, 2003.

(51) Int. Cl.
*G02B 5/18* (2006.01)
(52) U.S. Cl. ........................ 359/572; 359/576
(58) Field of Classification Search ................ 359/562, 359/571, 572, 576; 385/37
See application file for complete search history.

(56) References Cited

U.S. PATENT DOCUMENTS

| | | |
|---|---|---|
| 4,281,894 A | 8/1981 | Guha |
| 4,846,552 A | 7/1989 | Veldkamp et al. |
| 5,448,398 A | 9/1995 | Asakura et al. |
| 5,907,436 A | 5/1999 | Perry et al. |
| 5,925,878 A | 7/1999 | Challener |
| 5,995,285 A | 11/1999 | Unno |
| 5,999,318 A | 12/1999 | Morton et al. |
| 6,157,488 A | 12/2000 | Ishii |
| 6,162,495 A | 12/2000 | Morton |
| 6,191,890 B1 | 2/2001 | Baets et al. |
| 6,219,478 B1 | 4/2001 | Parriaux et al. |
| 6,529,321 B1* | 3/2003 | Pan et al. .................... 359/360 |

FOREIGN PATENT DOCUMENTS

DE              92640 A          1/1975

OTHER PUBLICATIONS

Moharam M G et al., "Rigorous Coupled-Wave Analysis of Metallic Surface-Relief Gratings", Journal of The Optical Society of America-A, Optical Society of America, Washington, US, vol. 3, No. 11, Nov. 1, 1986, pp. 1780-1787, XP000616808, ISSN.
Roumiguieres J L et al., "On the Efficiencies of Rectangular-Groove Gratings", Journal of the Optical Society of America, American Institute of Physics. New York, US, vol. 66, No. 8, Aug. 1976, pp. 772-775, XP002963365.

* cited by examiner

*Primary Examiner*—Alessandro Amari
(74) *Attorney, Agent, or Firm*—Lowrie, Lando & Anastasi, LLP

(57) ABSTRACT

A reflective diffraction grating having grooves and ridges and providing high throughput efficiency in the minus-first diffraction order. All but the zeroth diffraction order and the minus-first diffraction order may be prevented from existence by directing the radiation onto the grating at an appropriate angle. The radiation having a TM polarization is eliminated from the zeroth order by destructive interference by appropriate selection of a the groove width of the grating, and radiation having a TE polarization is eliminated from the zeroth order by destructive interference by depositing an overcoat of an appropriate thickness. A dielectric material may be deposited in the grooves.

79 Claims, 10 Drawing Sheets

DIFFRACTION GRATING HAVING HIGH THROUGHPUT EFFICIENCY

RELATED APPLICATIONS

This application claims priority under 35 U.S.C. § 119(e) to U.S. Provisional Patent Application Ser. No. 60/438,147, entitled "Diffraction Grating Having High Throughput Efficiency," filed on Jan. 6, 2003, which is herein incorporated by reference in its entirety.

BACKGROUND OF THE INVENTION

1. Field of Invention

The present invention relates in general to free-space, reflective diffraction gratings, and more particularly to free-space, reflective diffraction gratings having a high throughput efficiency.

2. Discussion of Related Art

Diffractive elements are used in many application areas to spatially separate the component wavelengths of polychromatic light. For example, in telecommunications applications, diffractive elements may be used to spatially separate the channels of a wavelength division multiplexed (WDM) signal for subsequent processing (e.g., gain equalization or switching). Examples of diffractive elements for achieving spatial separation, include fiber Bragg gratings (FBG), and reflective and transmissive free-space diffraction gratings. Each of these diffractive elements offers performance advantages and disadvantages. A diffractive element's suitability for a specific application is dependent on characteristics such as throughput efficiency, dispersion, polarization-dependent loss (PDL), as well as the diffrative element's size, manufacturability, expense, and sensitivity to environmental conditions.

As is well known, reflective diffraction gratings are comprised of a reflective surface having a plurality of spatially-separated, reflective grooves and intervening ridges that induce a spatial, periodic phase delay on a wavefront of a beam of light. The phase delay causes diffraction of the beam of light and angularly separates the beam into its component wavelengths of light. Conventional reflective, free-space diffraction gratings offer unique characteristics that make them suitable for many applications. However, as discussed below, they have performance shortcomings. Reflective, free-space diffraction gratings are referred to herein below as diffraction gratings or simply as gratings.

The term "throughput efficiency" is defined herein to mean the logarithm of the ratio of the useable portion of the output optical power to the total optical power incident on the diffraction grating. In many applications, the useable portion of the output power corresponds to a single diffraction order. This diffraction order is referred to herein as the diffraction order of interest. A high throughput efficiency typically means greater than approximately 85%.

In telecommunications applications, higher throughput efficiency often translates to a reduced need for amplifiers to boost the signal. Further, in many systems, a signal is first demultiplexed by the grating and then re-multiplexed by the grating. In such systems, the desirability of gratings having high throughput efficiency is compounded by the fact that the effects of low throughput efficiency are doubled.

The term "Polarization Dependent Loss" (PDL) is defined herein to mean the logarithm of the ratio of the throughput efficiency of the TE-polarized portion light (expressed in power) to the throughput efficiency of the TM-polarized light (expressed in power). In many applications, unpolarized light is incident upon a grating. Further, in such systems it is typically desirable that the transmission of light be independent of polarization so as to avoid producing a polarized output (i.e., it desirable that the PDL be as near to zero as possible). However, conventional diffraction gratings typically transmit light in a highly polarization-dependent manner, particularly when they provide a high dispersion.

The term "angular dispersion" is defined herein to mean a variation of the wavelength of light as a function of angle. For example, processing of a polychromatic signal by a diffraction grating gives rise to a corresponding dispersion. Dispersion by free-space reflective diffraction gratings may be characterized using the well known grating equation, $$\sin(\theta_m) = \sin(\theta_1) + m\frac{\lambda}{d} \tag{1}$$

where $\theta_i$ is the angle of the incident beam with respect to the grating normal, m indicates a diffractive order, $\theta_m$ is the angle of the $m^{th}$ diffractive order with respect to the grating normal, $\lambda$ is the wavelength of the light, and d is the period of the grating.

More particularly, for a plurality of wavelengths incident on a diffraction grating at a single angle, angular dispersion is given by the equation, $$\frac{d\theta_m}{d\lambda} = \frac{m}{d\cos\theta_m} \tag{2}$$

The term "linear dispersion" is defined as the product of angular dispersion and a selected length. Devices that process the spatially-separated channels of a WDM signal typically require a specific linear dispersion. Accordingly, it is typically desirable to have angular dispersion be as large as possible to minimize the space necessary to achieve a given amount of linear separation. As used herein below, the term "dispersion" refers to angular dispersion.

Traditional free-space diffraction gratings (i.e., gratings having a plurality of grooves and ridges without the use of any of the enhancement techniques described below) may be selected to provide a suitable throughput efficiency, dispersion, and PDL for a particular application. However, in many instances, a single traditional grating is not capable of producing suitable amounts of each. For example, a grating having a grating frequency of 1800 lines/mm is known to have a 90% throughput efficiency for TM-polarized light in a wavelength range of 0.8 to 0.9 µm. However, the efficiency of the TE-polarized light in this wavelength range is below 50%.

Traditional free-space diffraction gratings having a 1800 lines/mm grating frequency also provide high throughput efficiency for the TE-polarized light in a very narrow band around $\lambda$=0.5 µm; however, the efficiency of the TM-polarization in this wavelength range is below 50% (see pg. 78 of Diffraction Gratings and Applications, by Loewen, published by Marcel and Dekker, 1997). Additionally, traditional free-space gratings may be selected to provide high efficiency for both TE-polarized and TM-polarized light in a selected wavelength range; however, the dispersion in the selected range is low.

One example of an enhancement technique that may be applied to a diffraction grating is the addition of a blaze angle to the ridges comprising of the grating. A blazed grating has ridges shaped to maximize the efficiency of the grating at the blaze angle. For example, in the range 1525 nm to 1570 nm (i.e., the C-band)), a gold-coated grating having a frequency of 600 lines/mm, a blaze angle of 28–34°, and which is aligned in a Littrow mounting arrangement (i.e., an arrangement in which light in the minus-first diffraction order traces back over the path of the incident light), provides a throughput efficiency in the range of 80 to 85%, a PDL below 0.3 dB, and a dispersion of 680 μrad/nm for the first diffraction order.

The dispersion of such a blazed grating is relatively low thus requiring a large package size to achieve adequate linear dispersion. For example, for a WDM channel spacing of 0.8 nm in wavelength (100 GHz in frequency), the path length necessary to achieve a linear dispersion of 100 μm between channels, is on the order of 360 mm (180 mm to a lens and a further 180 mm to the focus). While a grating may be selected which provides greater dispersion, such gratings also produce increased PDL.

Other modification techniques have been employed to provide increased dispersion. For example, the ridges and grooves may be configured such that the diffraction order of interest is a second (or higher) diffraction order, which provides an increase in dispersion relative to a grating for which the diffraction order of interest is the first diffraction order. Such gratings are referred to as echelle gratings. While echelle gratings provide increased dispersion, they are limited by their throughput efficiency. Yet another example of modified grating is a "grism" (a combination of grating and prism). Grisms are known to provide high throughput efficiency and dispersion, but for only a single polarization.

Grating systems which "work around" the limitations of traditional gratings have provided improved dispersion, throughput efficiency, and PDL. However, such systems have been complicated and expensive to produce. Examples of such systems include systems employing polarization diversity techniques, and systems using multiple dispersive elements.

Polarization diversity is a technique in which the TE-polarized light and the TM-polarized light are spatially separated and one of the polarizations is rotated 90-degrees, such that all of the light is either TE-polarized or all of the light is TM-polarized. Accordingly, systems based on polarization diversity provide an opportunity to avoid limitations arising from reduced throughput efficiency of either the TE-polarized or TM-polarized light.

One example of a system based on polarization diversity includes components to spatially separate the TE-polarized portion of light from the TM-polarized portion of light, and components that convert the TE-polarized light to TM-polarized light. Subsequently, all of the light (now TM-polarized) is processed by a traditional diffraction grating selected to have a high-efficiency and high-dispersion for TM-polarized light. Drawbacks to polarization diversity techniques include the added expense resulting from the increased number of optical components, increased system size arising from the increased number of components, and an increase in alignment demands resulting from the increase in the number of the optical components.

An alternative "work around" technique employs multiple dispersive elements (each element having a relatively low dispersion) to achieve a relatively large aggregate dispersion. For example, in some systems, multiple prisms or multiple gratings may be placed in series to increase dispersion. Typically, each such element is selected to have a low PDL. Similar to the polarization diversity-based systems, drawbacks to the use of multiple dispersive elements include added expense resulting from the increased number of optical components, increased system size arising from the increased number of components, and an increase in alignment demands resulting from the increase in the number of the optical components; in addition, the use of multiple dispersive elements also results in a substantial decrease in throughput efficiency.

While some of the above grating systems may provide appropriate throughput efficiency, dispersion or PDL dependent loss for some applications, there remains a need for grating elements providing appropriate combinations of each characteristic, as well as providing appropriate size, manufacturability, and expense.

SUMMARY OF THE INVENTION

A first aspect of the invention is directed to a reflective diffraction grating for processing electromagnetic radiation, the radiation having a wavelength $\lambda$ and a TM-polarized portion, comprising: a substantially reflective surface comprising a plurality of grooves each having a width aligned in a first direction, and a plurality of ridges each having a width aligned in the first direction, the grooves and ridges being alternately disposed along the surface, and each of the grooves being adapted to propagate and reflect a waveguided portion of the TM-polarized portion of the radiation, and each of the grooves being adapted to provide a phase delay to the guided portion of the TM-polarized portion of the radiation, relative to a non-guided portion of the TM-polarized portion of the radiation reflected by the ridges, such that the zeroth diffraction order of the TM-polarized portion of the radiation is substantially canceled by destructive interference.

In some embodiments, a depth of each of the grooves is equal to about $(2k+1)\lambda/4$, where k is an integer. In some embodiments the diffraction grating further comprises a dielectric material having an index of refraction disposed on at least a portion of the reflective surface. The dielectric material may be non-conformally disposed on the reflective surface. The thickness of the dielectric material in the grooves may be greater than a thickness of the dielectric material on the ridges. The dielectric material may fill the grooves. In some embodiments, the diffraction grating is lamellar, whereby a top surface of the dielectric material is in a same plane with the ridges.

In some embodiments, the diffraction grating further comprises an overcoat layer disposed on the dielectric material having an index of refraction equal $n_0$. The radiation may further comprise a TE-polarized portion and the overcoat layer may be selected to have a thickness to impart a phase delay between a portion of the radiation reflected from a top surface of the overcoat layer relative to a portion of the radiation reflected from the ridges, the phase delay selected such that the zeroth diffraction order of the TE-polarized portion is substantially canceled by destructive interference. The overcoat layer may have a thickness equal to about $(2k+1)\lambda/4\,n_o$, where k is an integer. In some embodiments, the overcoat layer has an index of refraction that is different than the index of refraction of the dielectric material. However, the dielectric material and the overcoat layer may be made of the same material.

The cross sectional shape of the grooves may be one of sinusoidal, trapezoidal and sawtooth. In some embodiments, the reflective material is conductive. The reflective material may be a metal, and the metal may be gold. The diffraction grating may have a duty cycle of about 50%. The dielectric material may cover the ridges. The reflective surface may be disposed on a substrate. The grooves may be configured to transmit substantially only a $TM_0$ mode of the radiation. However, the grooves may be configured to transmit a $TM_0$ mode and a $TM_1$, mode of the radiation. In some embodiments, the throughput efficiency of the reflective surface is greater than 85% for both the TM-polarized portion and the TE-polarized portion.

Another aspect of the invention is directed to a reflective diffraction grating for processing electromagnetic radiation, the radiation having a wavelength $\lambda$ and a TM-polarized portion, comprising: a substantially reflective surface comprising a plurality of grooves each having a width aligned in a first direction, and a plurality of ridges each having a width aligned in the first direction, the grooves and ridges being alternately disposed along the surface, and each of the grooves being adapted to propagate and reflect a waveguided portion of the TM-polarized portion of the radiation, and each of the grooves being adapted to provide a phase delay to the guided portion of the TM-polarized portion of the radiation, relative to a non-guided portion of the TM-polarized portion of the radiation reflected by the ridges, the phase delay being about equal to $(2k+1)\lambda/2$, where k is an integer.

Yet another aspect of the invention is directed to a diffractive grating system, comprising: an electromagnetic radiation source arranged to project radiation onto a substantially reflective surface, the radiation comprising at least one wavelength $\lambda$ and a TM-polarized portion; and the substantially reflective surface comprising a plurality of grooves each having a width aligned in a first direction, and a plurality of ridges each having a width aligned in the first direction, the grooves and ridges being alternately disposed along the surface, and each of the grooves being adapted to propagate and reflect a guided portion of the TM-polarized portion of the radiation, and each of the grooves adapted to provide a phase delay to the guided portion of the TM-polarized portion of the radiation, relative to a non-guided portion of the TM-polarized radiation reflected by the ridges, the phase delay being about equal to $(2k+1)\lambda/2$, where k is an integer.

The depth of each of the grooves may be equal to about $(2k+1)\lambda/4$, where k is an integer. In some embodiments, a dielectric material having an index of refraction $n_g$ disposed on at least a portion of the reflective surface. In such embodiments, the width of each of the grooves may be less than $\lambda/(2n_g)$, and the width of each of the grooves may be less than 80% of $\lambda/(2n_g)$. The radiation may comprise a band of wavelengths and $\lambda$ is located approximately at the center of the band of wavelengths. The dielectric material may be non-comformally disposed on the reflective surface.

In some embodiments, an overcoat layer may be disposed on the dielectric layer having an index of refraction equal to $n_o$. In such embodiments, the radiation may comprise a TE-polarized portion and the overcoat layer may be selected to have a thickness to impart a phase delay between a portion of the radiation reflected from a top surface of the overcoat layer relative to a portion of the radiation reflected from the ridges, the phase delay being selected such that the zeroth diffraction order of the TE-polarized portion is substantially canceled by destructive interference. The overcoat layer may have a thickness equal to about $(2k+1)\lambda/4\ n_o$, where k is an integer. The overcoat layer and the dielectric material and the overcoat layer may be made of the same material.

In some embodiments, the radiation source comprises a laser. In other embodiments, the radiation source comprises an optical fiber. The radiation may be in the C-band. A polarization filter may be disposed between the radiation source and the reflective surface adapted to selectively transmit the TM-polarized portion of the radiation.

The grating may have a single grating period. The radiation source may be configured to project radiation onto the reflective surface at approximately a Littrow angle. The source and the reflective surface may be configured and arranged such that only the minus first order and the zeroth diffraction order are reflected by the reflective surface.

Another aspect of the invention is directed to a method of processing radiation comprising a wavelength $\lambda$ and a TM-polarized portion, comprising: projecting the radiation from a source onto a reflective diffraction grating comprising a plurality of grooves and a plurality of ridges, the grooves and the ridges being alternately disposed; reflecting a first portion of the radiation from the ridges; waveguiding a second portion of the radiation in the grooves; and reflecting the second portion of the radiation such that the act of reflecting the first portion and the act of reflecting the second portion combine to impart a phase difference between the first portion and the second portion equal to an odd multiple of 180 degrees.

The second portion of radiation may include only radiation in the $TM_0$ mode. The act of reflecting the first portion and the act of reflecting the second portion may combine to cause the zeroth diffraction order of the TM-polarized portion of the radiation to be substantially canceled. The step of waveguiding the second portion of the radiation may include projecting the radiation through a first dielectric material having an index $n_g$ that is disposed in the grooves.

The method may further comprise a step of projecting radiation onto an overcoat layer disposed on the reflective diffraction grating and having a top surface, at least the first portion and the second portion propagating through the overcoat layer. The radiation may further comprise a TE-polarized portion, and the step of projecting radiation onto the overcoat layer may comprise reflecting a third portion of the radiation from the top surface to impart a phase difference between the first portion of radiation and the third portion of radiation, the phase difference is equal to an odd multiple of 180 degrees. The step of projecting the radiation through the overcoat layer may include projecting radiation onto the overcoat layer at approximately a Brewster's angle. The step of projecting radiation may comprise projecting the radiation onto the diffraction grating at a Littrow angle.

Another aspect of the invention is directed to a method of manufacturing a diffraction grating for use at a selected wavelength, comprising the steps: depositing a first dielectric layer; depositing a second dielectric layer on the first dielectric layer; patterning the second dielectric layer; and depositing a reflective material onto the second dielectric layer, whereby the acts of patterning the second dielectric layer and depositing the reflective material comprise forming a reflective surface having a plurality of grooves and ridges.

In some embodiments, the method further comprises a step of providing a platform, wherein the act of depositing the first dielectric layer comprises depositing the first dielectric layer on the platform. The platform may be transparent at the selected wavelength. The method may further comprise steps of: attaching a substrate to the reflective material; and removing the platform from the first dielectric layer.

BRIEF DESCRIPTION OF THE DRAWINGS

Illustrative, non-limiting embodiments of the present invention will be described by way of example with reference to the accompanying drawings, in which the same reference number is used to designate the same components in different figures, and in which.

DETAILED DESCRIPTION OF THE INVENTION

Figure 1A:
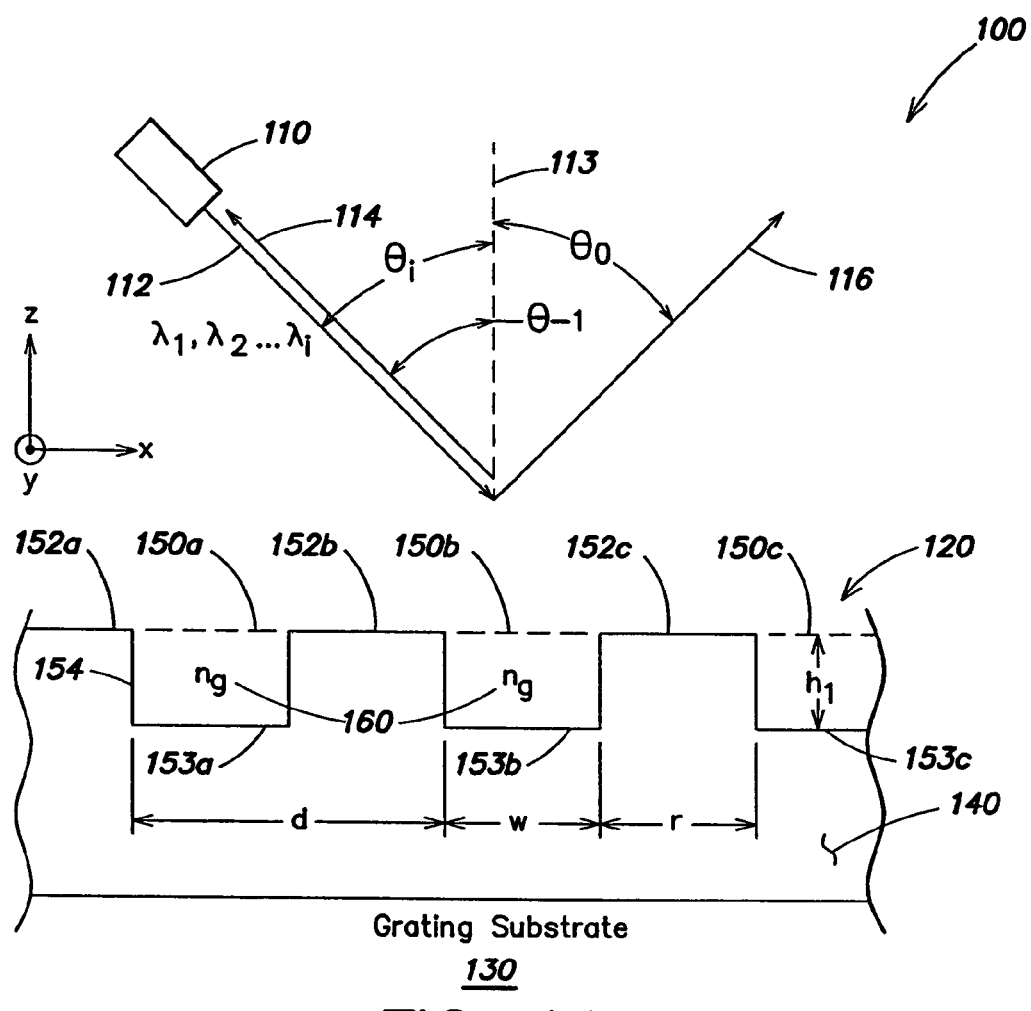
FIG. 1A is a cross-sectional side view of an embodiment of a diffractive optical system according to some aspects of the invention.

FIG. 1A is a cross-sectional side view of an embodiment of a diffractive optical system 100 according to some aspects of the invention, in which light from a source 110 is projected onto a grating 120 and output from the grating in a first diffractive order with a relatively high throughput efficiency. Diffraction grating 120 includes a reflective material 140 having a surface having a plurality of grooves 150a–150c and ridges 152a–152c, and a dielectric 160 disposed in grooves 150. It is to be appreciated that FIG. 1A is a representative portion of a grating. Gratings according to aspects of the present invention may have any suitable number of grooves and ridges. As described herein below, grooves 150 are adapted to operate as waveguides for a portion of light projected onto grating 120. Ridges 152 are the non-waveguiding portions of the surface that are located intermediate the grooves. Ridges may be flat or curved.

Source 110 may be any suitable electromagnetic source having one or more wavelengths of light $\lambda_1 \ldots \lambda_i$. For example, source 110 may be a single laser, or a plurality of lasers, or may be fiber optic carrying one or more discrete wavelengths of light (e.g., the channels of a WDM signal).

While the principles of the present invention may be applied to a broad range of wavelengths of radiation, the term "light" is used interchangeably with the term "electromagnetic radiation." The term "light" is not intended to be limiting to visible wavelength bands, and light refers to any suitable wavelength of electromagnetic radiation.

Light from source 110, having one or more wavelengths $\lambda_1 \ldots \lambda_i$ is incident on the grating at an angle of incidence $\theta_i$. For example, the one or more wavelengths may be equally spaced wavelengths of a telecommunications device operating in the C-band. In the illustrated embodiment, all wavelengths $\lambda_1 \ldots \lambda_i$ are assumed to be incident on grating at angle $\theta_i$; however, the invention is not so limited and each wavelength may be incident at a distinct angle. In some embodiments, the source 110 and grating 120 are located to achieve the Littrow condition (i.e., the minus-first diffractive order 114 reflects back over the incident beam of light 112).

In some embodiments, source 110 and grating 120 are located such that only the zeroth diffraction order 116 (i.e., specularly reflected light) and minus-first order 114 are physically possible. That is, wavelengths $\lambda_1 \ldots \lambda_i$, period d of grating 120, and angle of incidence $\theta_i$ are selected such that the remaining orders are physically incapable of existing (i.e., they correspond to diffraction angles $\theta_m$ greater than 90 degrees from normal 113). In some embodiments, it is preferable that all of the wavelengths in the plus-first order are precluded (i.e., all wavelengths projected from source 110). The zeroth diffraction order 116 and minus-first order 114 are generated at angles $\theta_0$ and $\theta_{-1}$, respectively.

In the illustrated embodiment, grating 120 is a lamellar grating (i.e., the grooves and ridges have a rectangular cross section). However, aspects of the invention are discussed with reference to a lamellar grating structure merely to facilitate description, and the invention is not so limited.

Grating 120 includes a plurality of grooves 150 having widths w and depths $h_1$. Grating 120 is characterized by coordinate axes x, y and z, where, the x-axis extends in the direction of the widths w of grooves 150, the y-axis extends in the direction of the lengths of grooves 150, and the z-axis is normal to the plane formed by ridges 152 (i.e., parallel to normal 113 ). While, the illustrated grating has a single period d, it may be possible to apply principles of the present invention to gratings having a plurality of periods, such as chirped gratings.

Reflective material 140 may be any suitable conductive material having a surface 154 with ridges 152 and grooves 150. For example, the reflective material may be made of a metal. Dielectric 160 is disposed in grooves 150 non-conformally. That is, the dielectric does not coat surface 154 with a uniform thickness (i.e., the dielectric does not assume the shape of surface 154 ). Preferably, the coating thickness is greater in grooves 150 than on ridges 152. In some embodiments, dielectric 160 fills grooves, but does not coat the tops of ridges 152. Dielectric 160 may be any suitable dielectric which transmits light from source 110. Dielectric 160 has a refractive index $n_g$.

Optionally, grating 120 includes a substrate 130. Substrate 130 may be any suitable substrate material. Substrate 130 is preferably mechanically stable and is preferably made of a material having a low thermal expansion.

Surface 154 is configured such that grooves 150 operate as terminated, parallel-plate waveguides in the z-direction. The principles of parallel plate waveguides are well known and therefore are not discussed in detail below. The term "terminated waveguide" means that the waveguide has a bottom (e.g., one of bottoms 153a–153c) from which guided light reflects.

Because grooves 150 are bounded in two directions by reflective material 140 in the direction of the x-axis and because reflective material 140 is conductive, boundary conditions require that at the edges of grooves 150, the electric field of any radiation propagated in grooves 150 equals zero in the y-direction (i.e., $E_y=0$) and the magnetic field of any propagated radiation equals zero in the x-direction ($H_x=0$). The principles of parallel plate waveguides determine which modes ($TE_n$, for n=1, 2, . . . and $TM_n$, for n=0, 1, 2, . . . ) are allowed to propagate in grooves 150. The fundamental mode $TM_0$ is physically allowed to propagate in grooves 150, regardless of the dimension of width w because, for $TM_0$, $H_x$ and $E_y$ are equal to zero. The remaining TE and TM modes (i.e., $TE_n$ and $TM_n$, where n is equal to one or greater) are allowed to propagate in grooves having widths w (in the x-direction) that are sufficiently large. The cutoff frequencies $\omega_{n,cutoff}$ of the modes, are described by Equation 3.

$$\omega_{n,cutoff} = \frac{n\pi}{w\sqrt{\mu\varepsilon}} \quad (3)$$

In particular, Equation 3 indicates that the widths w of grooves 150 must be greater than one-half of the wavelength of the electromagnetic radiation from source 110 in the dielectric, for the $TE_1$ or $TM_1$ modes to propagate. Accordingly, for widths w that are less than one-half of the wavelength in the dielectric medium ($\lambda/(2n_g)$), the TM polarized light incident on grooves 150 couples to the $TM_0$ mode, but not into TM modes where n is one or greater. Further, none of the TE-polarized light incident on diffraction grating 120 is allowed to propagate into grooves 150. Thus, for groove widths below $\lambda/(2n_g)$, only the TM-polarized light couples into grooves 150. In some embodiments, a filter 115 may be used to selectively transmit TM-polarized light.

It is to be appreciated that Equation 3 assumes that surface 154 is made of a perfect conductor and dielectric 160 is a perfect dielectric. Accordingly, as one of ordinary skill in the art would understand, when real (i.e., non-perfect) materials are implemented, the actual cutoff frequency will differ from that predicted by Equation 3. A suitable width w can be selected, for example, using a software package such as "G-solver" produced by Grating Solver Development Company of Allen, Tex. Typically, width w corresponding to a given cutoff frequency for a waveguide (i.e., one of grooves 150) made of non-perfect materials is slightly smaller than that predicted by Equation 3.

Depths $h_1$ of grooves 150 are selected such that there is a half-wavelength phase delay (or and odd multiple of a half-wavelength delay) of the guided portion of the TM-polarized light (i.e., the portion of the light incident on and propagated by grooves 150), relative the non-guided portion of the TM-polarized light (i.e., the portion of the light incident on ridges 152). Accordingly, for the zeroth diffraction order (i.e., the specularly reflected portion of the TM polarized light), the light from ridges 152 and light from grooves 150 destructively interfere in the far field (i.e., the TM-polarized light in the zeroth order is suppressed). While full suppression is preferable, there may be some residual radiation, for example, due to the light having a finite bandwidth.

However, for the minus-first diffractive order of light, the phase difference between the guided portion of the TM-polarized light, relative to the non-guided portion of the TM-polarized light is other than a half-wavelength of length.

Because, as described above, the zeroth diffraction order and the minus-first diffraction order are the only diffraction orders capable of existing, and because the zeroth diffraction order is suppressed, there is a high throughput efficiency for TM-polarized light in the first diffractive order.

It is to be appreciated that while the height h, is selected to suppress TM-polarized light in the zeroth order for only a single wavelength, for a suitably small wavelength band (e.g., the C-band in a telecommunications system), the light of other wavelengths incident on grating 120 have a throughput efficiency that is reduced to a high degree. In some embodiments, the height $h_1$ is selected to suppress light having a wavelength near the middle of the wavelengths $\lambda_1 \ldots \lambda_i$ incident on grating 120.

To achieve a half-wavelength phase delay for the guided portion of the TM-polarized light relative to the non-guided portion of the TM-polarized light, a groove depth h, is selected according to Equation 4.

$$h_1 = \frac{\lambda}{4n_g}(2k+1), k = 0, 1, 2, \ldots \quad (4)$$

where $\lambda$ is the free space wavelength. Again, in practice, the depth may not correspond exactly to the value indicated by Equation 4 because Equation 4 assumes that the grating is made of a perfect conductor and a perfect dielectric. Accordingly, as one of ordinary skill in the art would understand, when real materials are implemented, the depth of a groove $h_1$ to achieve a half-wavelength phase difference between light reflected form ridges 152, and light guided by grooves 150 (and reflected from the bottoms of the grooves) may differ from the theoretical depth provided by Equation 4. A suitable depth $h_1$ can be selected, for example, using a software package such as "G-solver."

In the illustrated embodiment, the depth of dielectric 160 may be equal to the depth $h_1$ of grooves 150, such that dielectric 160 fills grooves 150. However, the invention is not so limited and the depth of dielectric may be any suitable depth. It is to be appreciated that the phase delay of the guided portion of the TM-polarized light relative to the non-guided portion of the TM-polarized light is dependent on the optical path length of grooves 150, which in turn is dependent on the selected depth of dielectric 160.

In some embodiments, filling the groove such that the top surface of dielectric 160 is coplanar with ridges 152 may be advantageous because the presence of dielectric allows the width w necessary to achieve a selected cutoff frequency (as described above) to be substantially equal to the width of ridges 152 (i.e., the rectangular cross section of ridges 152 and grooves 150 has a 50% duty cycle).

In the case of minimal absorption by the reflective material (i.e., a near perfect metal), to achieve cancellation of the zeroth diffraction order of the TM light, the quantity of the guided portion of the TM-polarized light and the quantity of the non-guided portion of the TM-polarized light are preferably equal. That is, it is preferable that groove width w is equal to the ridge width r. However, the invention is not so limited and calculations have indicated that in some embodiments, adequate cancellation can be obtained for gratings having groove widths w which are different than the ridge widths. It is believed that this insensitivity is at least partially due to the fact that the power in an electric field varies as the square of the amplitude of the electric field. Accordingly, for example, an imbalance in the fields of 10%, resulting from the ridge widths and groove widths being different by 10%, results in a 1% increase in power in the zeroth diffraction order 116 and a corresponding reduction of light in the minus-first diffraction order 114. That is, rather than the light being present in the minus-first diffraction order 114 (i.e., the diffraction order of interest), the power is present in the zeroth diffraction order 116.

Because modes other than the $TM_0$ mode emerge from groove 120 with a different phase delay than the $TM_0$, the ability to suppress the TM-polarized portion of the zeroth diffraction order is partially dependent on the ability to prevent propagation of modes other than the $TM_0$ mode by appropriate selection of width w. For values of width w which result in a cutoff frequency near the cutoff frequency of the $TM_1$ mode, some coupling into the $TM_1$ waveguide mode may occur. Near cutoff, then, it becomes more difficult to accomplish complete TM suppression in the far field. Accordingly, in some embodiments, it is preferable, that the width w be significantly below that necessary to achieve complete cutoff of the $TM_1$ mode (e.g., width w may be selected to have a value equal to 80% of the theoretical width w).

While cutoff of the $TM_1$ mode may be preferable in some applications, distinct minima in the zeroth diffraction order of the TM-polarized light are present for selected groove depths, even if the $TM_1$ mode is allowed to propagate in grooves 150. Also, while the throughput efficiency of the device (i.e., the amount of TM-polarized light in the minus-first diffractive order) may not be as high as the throughput efficiency would be if the $TM_1$ mode were suppressed, the efficiency may be suitable for some applications. Diffraction gratings which operate above the cutoff of $TM_1$ mode are within the scope of the present invention.

To summarize, according to some embodiments of the invention, angle of incidence $\theta_i$, and period of grating d, may be selected such that, for selected wavelengths of light, only the minus-first diffractive order and the zeroth diffractive order are physically capable of existing. Additionally, width w may be selected to propagate only the $TM_0$ mode. In such an arrangement, the depth of groove $h_1$ may be selected such that the zeroth diffraction order of TM-polarized light is suppressed by achieving a half-wavelength phase difference (i.e., a 180-degree phase difference) between the guided portion of the TM-polarized light and the non-guided portion of the TM-polarized light. Accordingly, the TM-polarized light in the zeroth diffraction order is suppressed and the TM-polarized light emerges in the minus-first diffraction order with high efficiency.

Figure 1B:
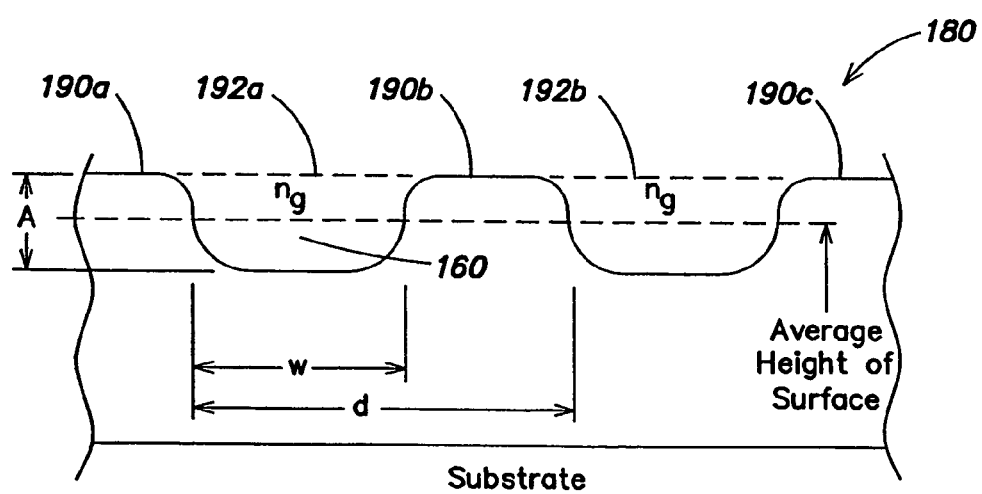
FIG. 1B is a cross-sectional side view of another embodiment of a diffraction grating according to some aspects of the invention.

FIG. 1B is a cross-sectional side view of another embodiment of a diffraction grating 180 according to some aspects of the invention. Diffraction grating 180 is similar to diffraction grating 120 in FIG. 1A in all regards except that grating is non-lamellar grating (i.e., ridges 190a–190c and/or grooves 192a–192b are non-rectangular). It is to be appreciated that grating 180 can provide suppression of the zero-order reflection of TM light similar to the grating 120 of FIG. 1A. While the waveguide and reflection aspect are more difficult to describe, it is to be appreciated that one of ordinary skill in the art, using the teachings of the present invention, would be able to use a software package such as "G-solver," to produce a diffraction grating having, for example, a representative groove width w (measured at the average amplitude of the reflective material) and a period d in accordance with the principles of the present invention. A suitable depth of dielectric 160 may be less than, equal to, or greater than the amplitude A of grating 180. In a grating in which the depth of the dielectric is greater than amplitude A, the grooves and ridges maybe completely covered. In embodiments, in which the grooves are covered by the dielectric material, the portion covering the ridges forms an overcoat layer as describe below. It is also to be appreciated that ridges 190a–190c and grooves 192a–192b may be sinusoidal, trapezoidal, sawtooth or any other suitable shape.

Figure 2:
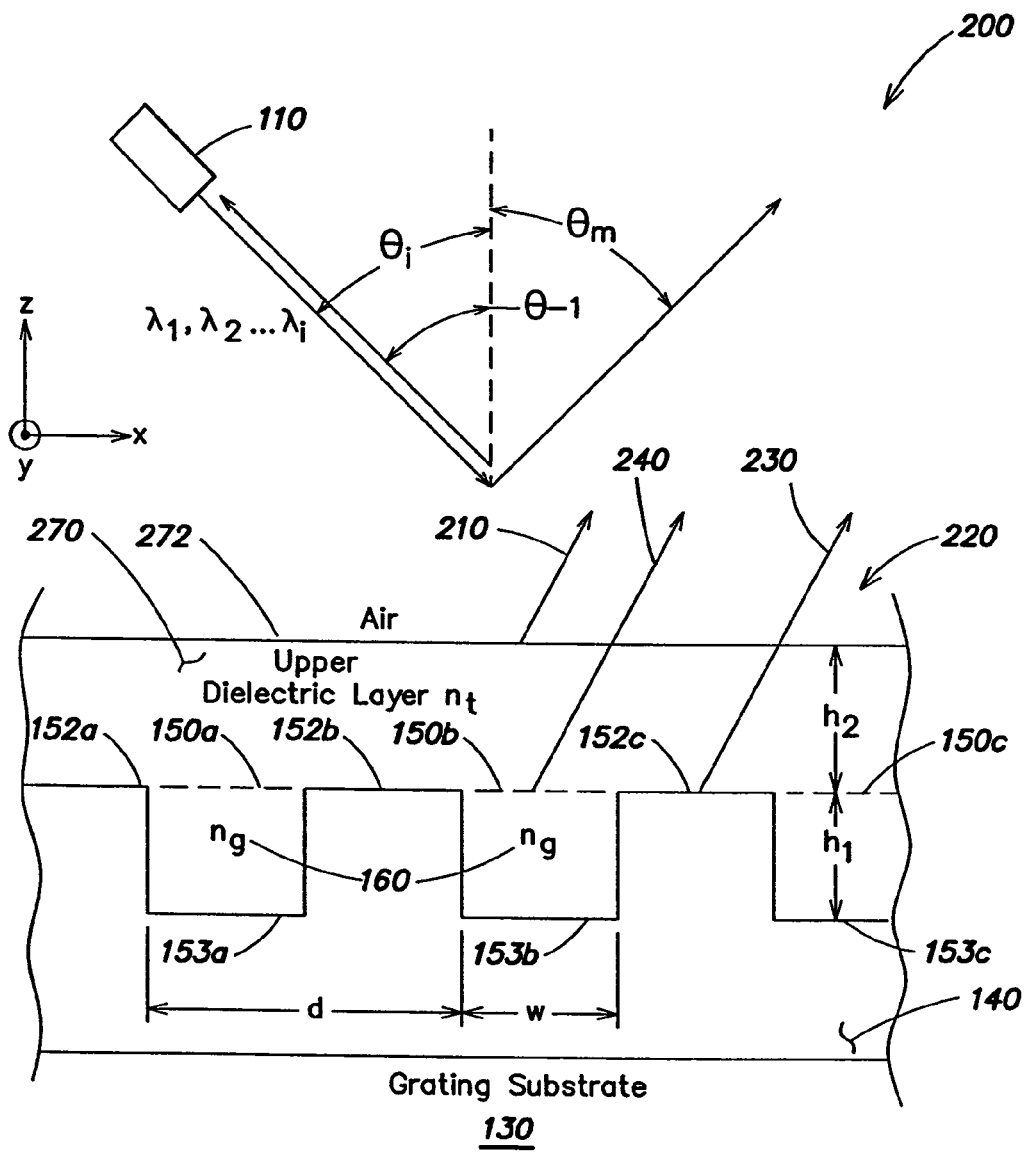
FIG. 2 is a cross-sectional side view of still another embodiment of a diffractive optical system according to some aspects of the invention.

FIG. 2 is a cross-sectional side view of another embodiment of a diffractive optical system 200, including a source 110 and a diffraction grating 220, according to at least some aspects of the invention. Diffraction grating 220 includes reflective material 140, plurality of grooves 150a–150c and ridges 152a–152c, dielectric 160, and a dielectric overcoat 270 having a refractive index $n_t$ and thickness $h_2$. Grating 220 is the same as grating of FIG. 1A except for the addition of dielectric overcoat 270. As discussed with reference to FIG. 1A, the angle of incidence $\theta_i$, wavelength range $\lambda_1 \ldots \lambda_i$, and period d may be selected such that only the minus-first diffraction order and the zeroth diffraction order are capable of existing, and a width w and depth $h_1$ to suppress the TM light in the zeroth diffraction order.

Thickness $h_2$ and index $n_t$ of dielectric layer 270 can be used to suppress the zeroth diffraction order of the TE-polarized portion of light incident on grating 220 without significantly affecting diffraction of the TM-polarized portion of the light. Accordingly, the discussion of TM-polarized light described above applies to optical system 200. In particular, the effect of overcoat 270 on the TM-polarized portion of light is minimal if the angle of incidence $\theta_i$ is at or near Brewster's angle (i.e., the angle at which TM-polarized light is transmitted through top surface 272 of dielectric overcoat 270 without refraction). As described above, in some embodiments, the angle of incidence $\theta_i$ is selected to be the Littrow angle. In some embodiments the Littrow angle is near Brewster's angle. However, even at angles of incidence other than Brewster's angle, the effect of the top layer on the TM-polarized light may be minimal provided angle of incidence $\theta_i$ is near Brewster's angle (i.e., within approximately 10-degrees). Accordingly, the dielectric overcoat may be used to control suppression of the zeroth diffraction order of the TE-polarized light independently of suppression of the zeroth diffraction order of the TM-polarized light as described above with reference to FIG. 1A.

Dielectric overcoat 270 is disposed on dielectric 160 and on ridges 152a–152c. While in some embodiments the dielectric overcoat 270 is disposed directly on dielectric 160 and on ridges 152a–152c, the invention is not so limited. For example, dielectric 160 may extend over ridges 152a–152c, such that overcoat 270 does not directly contact ridges 152a–152c.

Dielectric overcoat 270 may be made of the same material as dielectric 160 and may be formed during a single deposition. However, in some embodiments, the material used to make dielectric overcoat 270 is different than dielectric 160 to provide an additional degree of freedom, with which to suppress the zeroth diffraction order of the TE-polarized light.

As describe above, the $TE_1$ mode may be precluded by an appropriately selected groove width w. While the TE-polarized light may be precluded from propagating in grooves 150, it forms an evanescent field in grooves 150. That is, the electric field of TE-polarized light penetrates the surface defined by ridges 152, but decays exponentially with distance into grooves 150.

Because, below the cutoff frequency, TE light is not allowed to propagate into grooves 150, the TE-polarized light effectively reflects from a surface corresponding to the ridges 152 or an effective surface proximate that surface, as determined by the evanescent field. The evanescent penetration of the TE-polarized light incident on grooves 150 results in a phase delay of the TE-polarized light incident on grooves relative to the TE-polarized light incident on ridges. The phase delay causes grating 220 to operate as a reflective phase grating for TE-polarized light despite the fact that TE-polarized light is prevented from propagating in grooves 150. Close to the cutoff frequency for the $TE_1$ mode, calculations indicate that the phase delay of the light incident on grooves 150 resulting form the evanescent penetration is approximately equal to $0.20\lambda/n_g$ to $0.25 \lambda/n_g$, and the phase delay decreases as the grooves 150 narrow (i.e., as the width w is reduced from the values corresponding to the cutoff of the $TE_1$ mode). For some groove depths $h_1$, TE-polarized light may interact (i.e., partially reflect from) the bottoms 153a–153c of grooves 150. However, as depth $h_1$ increases, the reflection decreases, and gradually reaches a value of substantially zero.

Since the phase grating affecting the TE-polarized light has the same periodicity as the underlying structure (i.e., the period formed by grooves 150 and ridges 152 ), diffraction angles and dispersion of the TE-polarized light are the same as for the TM-polarized light. Accordingly, the first diffraction order and the minus-first diffraction order of the TE-polarized light travel the same pathways as the zeroth diffraction order and first diffraction order of the TM-polarized light, respectively. Further, if the zeroth diffraction order of the TE-polarized light can be suppressed (e.g., by appropriate selection of an overcoat layer), a high efficiency throughput of TE-polarized light in the minus-first order can be achieved similar to that achieved for the TM-polarized light. Accordingly, because high throughput efficiency can be achieved for both TE-polarized light and TM-polarized light, a grating having a high throughput efficiency, and a low PDL may be achieved.

The thickness $h_2$ and the refractive index $n_r$ of dielectric overcoat 270, as well as the angle of incidence $\theta_i$ may be used to control the amount of light in the zeroth diffraction order of TE-polarized light. There are three components of TE-polarized light to be balanced to suppress the zeroth diffraction order of TE-polarized light: (1) a portion 210 reflected from the top surface 272 of the dielectric overcoat 270 (as determined by Fresnel reflection characteristics of dielectric overcoat 270 ), (2) a portion 230 reflected from the tops of ridges 152, and (3) a portion 240 reflected from grooves 150 (as determined by the evanescent nature of light in the grooves; it is to be appreciated that this component will not exist if the overcoat and dielectric have the same index of refraction and are in intimate contact).

The index $n_r$ and angle of incidence $\theta_i$ of overcoat layer 270 determine the amplitude of portion 210 of the TE-polarized light, and the depth $h_2$ of dielectric overcoat 270 controls the relative phase difference between the portion 210 and the other two portions 240, 230 of TE-polarized light. As demonstrated in the examples below, calculations show that there is enough adjustability using these parameters to suppress the zeroth diffraction order of the TE-polarized light.

While the above discussion assumes that depth $h_1$ is great enough to avoid interaction of the TE-polarized light with the bottom of grooves 150, in some embodiments, the grooves 150 are shallow, and the evanescent field of the TE-polarized light interacts with the bottoms 153 of the grooves 150. In such embodiments, the amplitude of the reflected TE-polarized light is dependent on the dimensions of grooves 150, despite the fact that TE-polarized light does not propagate in grooves 150.

Calculations indicate that for grooves 150 having depths $h_1$ equal to $\lambda/(4n_g)$ (i.e., the smallest value that produces a 180-degree phase difference between the guided portion of TM-polarized light and the portion of the TM-polarized light reflected from the surfaces of ridges 152), there is some coupling of the TE-polarized light and the bottom of groove 150. At depth $h_1$ equal to $3\lambda/(4n_g)$ (i.e., the second smallest value that produces a 180-degree phase difference between the guided portion of TM-polarized light and the portion of the TM-polarized light reflected from the surfaces of ridges 152), there is very little dependence on the groove parameters for the TE-polarized light. For the second smallest value (and all larger values) of thickness $h_1$ that produce a 180-degree phase difference between the guided portion of TM-polarized light and the portion of TM-polarized that is reflected from the surfaces of ridges 152, the groove parameters affect only the suppression of the zeroth diffraction order of the TM-polarized light, whereas the dielectric overlayer parameters affect only the suppression of the zeroth diffraction order of the TE-polarized light.

While such independence provides advantages in manufacturing, because the characteristics of the TE-polarized light and the characteristics of the TM-polarized light are controlled by mutually exclusive sets of parameters, the invention is not limited to such embodiments. For example, in some embodiments, the advantages of working with a shallow groove depth $h_1$ may out weigh the advantages of working with a groove depth $h_1$ in which the characteristics of the TE-polarized light are independent of the shapes of grooves 150. In embodiments in which the TE-polarized light interacts with the bottom of grooves 150, the interaction may be controlled by selection of overcoat layer 270 to achieve cancellation of the zeroth order of TE-polarized light. For example, modeling may be used to accommodate the effect of interaction with the bottom of grooves 150 so that components (1), (2), and (3) may be cancelled.

As with the embodiment described above with reference to FIG. 1A, in some embodiments of diffractive optical system 200, width w is selected to cutoff the $TE_1$ and $TM_1$ modes. However, the invention is not so limited and in some embodiments of the present invention, the $TE_1$ and $TM_1$ modes are allowed to propagate in grooves 150 (i.e., they are not in cutoff). In such embodiments, the total transmission of the zeroth diffraction order of the TE-polarized light and the zeroth diffraction order of the TM-polarized light may be reduced or suppressed by destructive interference according to the principles of the present invention. However, it is to be appreciated that design and fabrication of high-efficiency gratings in which $TE_1$ and $TM_1$ modes are permitted may be more difficult because suppression of both the zeroth diffraction order of TE-polarized light and the zeroth diffraction order of TM-polarized light depends upon the dimensions of grooves 150.

While the above discussion of cancellation of the zeroth diffraction order of TM-polarized light and the zeroth diffraction order of the TE-polarized light in diffractive optical system 200 was made with reference to a lamellar waveguide, suppression of the zeroth-order of TE-polarized light and TM-polarized light may be achieved with non-lamellar diffraction gratings. While the waveguide and reflection performance of non-lamellar gratings is more difficult to describe verbally, one of ordinary skill in the art would be able to use a software package such as "G-solver" to produce a diffraction grating in accordance with the principles of the present invention. Gratings according the principles of this aspect of the invention may be sinusoidal, trapezoidal, sawtooth or another suitable shape.

It is to be appreciated that gratings according to aspects of the present invention may be used in any suitable applications where a fixed (i.e., non-actuatable grating) is implemented (e.g., telecommunications systems and spectroscopic applications). The following is a list of exemplary telecommunications systems employing fixed grating: blockers, equalizers, adders/droppers, and multiplexer/demultiplexers. Examples of equalizers employing fixed gratings, in which a grating according to aspects of the present invention may be substituted, are described in U.S. application Ser. No. 10/446,299, titled TELECTOMMICATIONS OPTICAL PROCESSOR, to Smith et al., filed May 28, 2003 (see for example FIGS. 1 and 2). The substance of said application is hereby incorporated by reference in its entirety.

The following are two exemplary embodiments of diffraction gratings according to at least some aspects of the present invention, which were designed and tested using the "G-Solver" software package.

EXAMPLE 1

1100 Lines/mm Grating, and a Groove Depth of ¾ of the Operational Wavelength

For this example, a design wavelength of 1.55 µm was chosen, which is approximately the center of the optical telecommunications C-band. A groove frequency of 1100 lines/mm was selected (i.e., a grating period of d=0.91 µm) to achieve moderately high dispersion. As determined using Equation 2, the dispersion of such a grating is 2100 µrad/nm at the Littrow angle (58.4°). An angle of incidence equal to the Littrow angle is selected, even though in practice a small angular deviation between incident and diffracted beams may be desirable, to separate the input and output beams.

The reflective material is selected to be gold, which has a refractive index $n_{Au}$=0.56+9.85i. The grooves are filled with an $SiO_2$ dielectric, which has an index of refraction $n_g$=1.444 at the design wavelength. According to Equation 1, the groove width required for cutoff of the $TM_1$ and $TE_1$ modes ($w \leq \lambda/(2n_g)$) is $w \leq 0.54$ µm. A groove width w of 0.43 µm (80% of the cutoff width) is selected to avoid the influence of higher waveguide modes. The resulting duty cycle (w/d) is 0.47, which is nearly equal to the value of 0.5 suitable for achieving suppression of the zeroth order diffraction of TM-polarized light.

Figure 3:
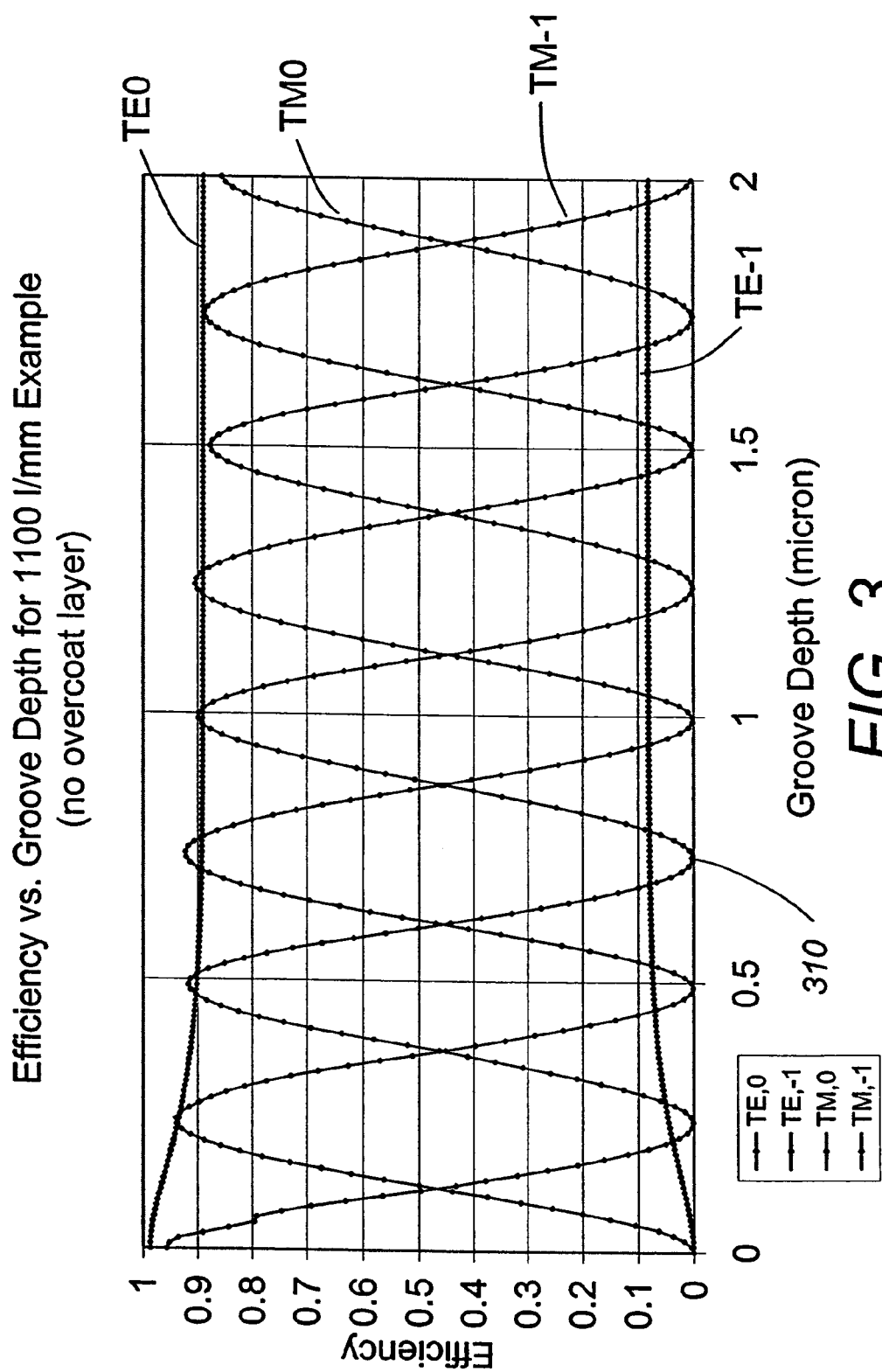
FIG. 3 is a graphical illustration of calculated values of $TM_0$ $TM_{-1}$ $TE_0$ $TE_{-1}$ as a function of groove depth for a grating having a frequency of 1100 lines/mm (for a grating with no overcoat layer)

FIG. 3 is a graphical illustration of calculated values of $TM_0$ $TM_{-1}$ $TE_0$ $TE_{-1}$ as a function of depth $h_1$ of the grooves 150 (for a grating with no overcoat layer). $TM_0$ mode suppression occurs at depths $h_1$ close to the odd multiples of a quarter of the effective design wavelength (i.e., the wavelength in dielectric 160 ). Both $TE_0$ and the $TE_{-1}$ exhibit asymptotic diffraction efficiency as depth $h_1$ increases, indicating that the TE-polarized light does not penetrate much more than about 0.5 µm into the grooves. In order to eliminate interaction of the TE-polarized light with the bottoms of the grooves, the $2^{nd}$ minimum 310 of TM-polarization transmission is selected to achieve suppression of the zeroth diffraction order of the TM-polarized light (i.e., $h_1$=0.74 µm).

The zeroth diffraction order of the TE-polarized light is now suppressed by selecting an appropriate overcoat layer thickness $h_2$. Modeling shows that with an index of $n_f$=1.70, the zeroth diffraction order of TE-polarized light can be fully suppressed. For example, materials with a refractive index close to $n_f$=1.70 are SiON or $Al_2O_3$.

Figure 4:
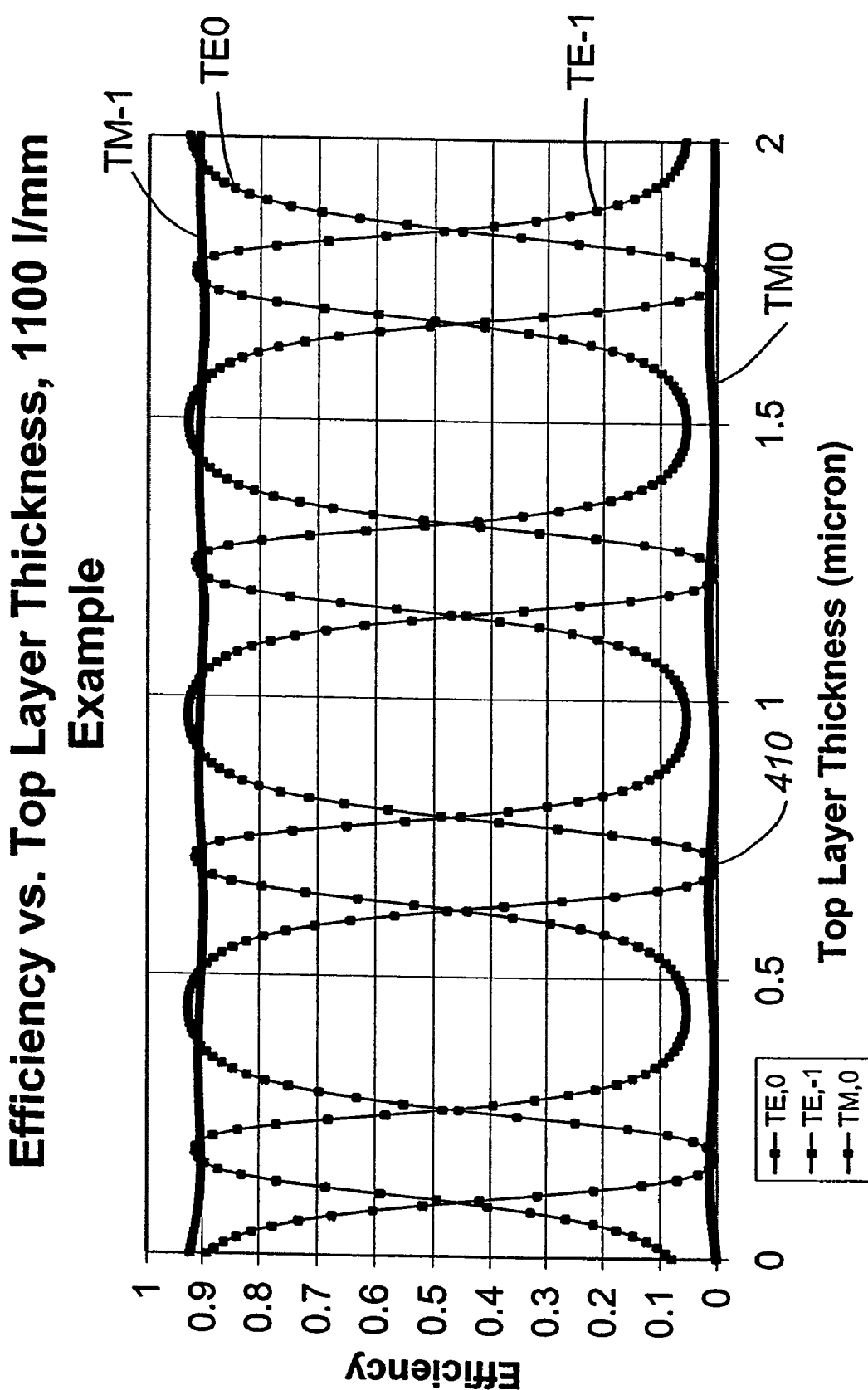
FIG. 4 is a graphical illustration of calculated values of $TM_0$ $TM_{-1}$ $TE_0$ $TE_{-1}$ as a function of the dielectric overcoat thickness for a grating having a frequency of 1100 lines/mm.

FIG. 4 is a graphical illustration of calculated values of $TM_0$ $TM_{-1}$ $TE_0$ $TE_{-1}$ as a function of overcoat layer thickness $h_2$. The dependence of the throughput efficiency of TM-polarized light on the thickness $h_2$ of overcoat layer 270 is weak. The smallest layer thickness $h_2$ that provides suppression of the zeroth diffraction order of the TE-polarized light occurs at location 410 $h_2$=0.18 µm, although any of the other values that provides suppression of the zeroth diffraction order of the TE-polarized light may be used.

Figure 5:
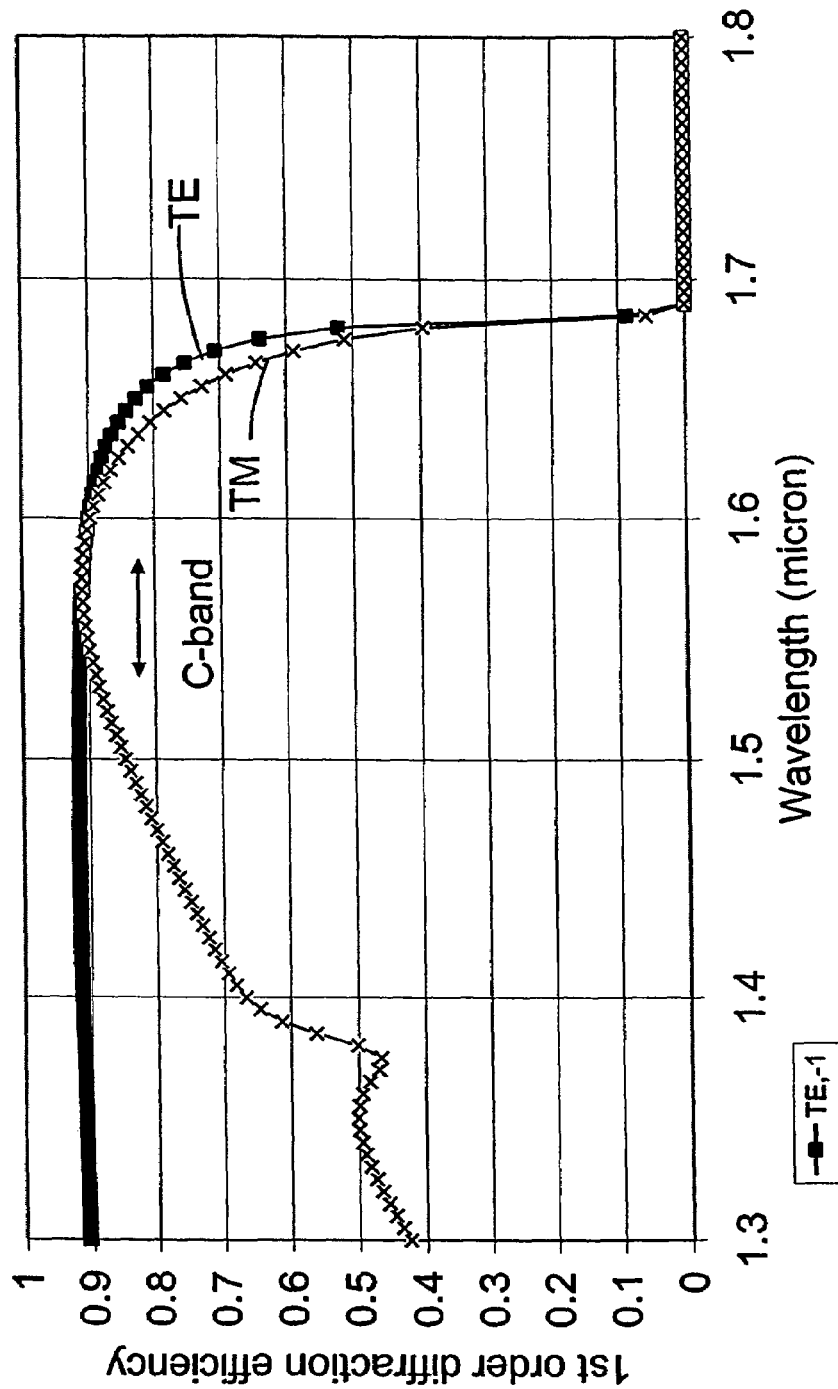
FIG. 5 is a graphical illustration of calculated throughput efficiency as a function of operational wavelength for a grating made according to the values selected with reference to FIG. 3 and FIG. 4.

FIG. 5 is a graphical illustration of calculated throughput efficiency of the grating resulting from the values selected above with reference to FIG. 3 and FIG. 4, as a function of operational wavelength. For each of the wavelengths in the C-band, the throughput efficiency of the minus-first diffraction order of TE-polarized light is 90% or better and the throughput efficiency of the minus-first diffraction order of TM-polarized light is 86% or better. The calculated maximum PDL is 0.2 dB. The drop in efficiency at λ=1.69 µm is due to the fact that the minus-first order diffraction is disallowed by the grating equation at this wavelength.

EXAMPLE 2

1220 Lines/mm Grating, and a Groove Depth of ¼ of the Operational Wavelength

For Example 2, a design wavelength of 1.55 µm is again chosen. To obtain a higher dispersion value, the grating line frequency is selected to be 1220 lines/mm (i.e., a period of d=0.82 µm). As determined using Equation 2, the dispersion is 3700 µrad/nm at the Littrow angle (70.9°). The reflective material is again selected to be gold and groove dielectric is selected to be $SiO_2$. The width w to achieve cutoff of the $TM_1$ and $TE_1$ modes is the same as above, $w \leq \lambda/(2n_g)$, or $w \leq 0.54$ µm. However, with a smaller period and with the groove width chosen to be 80% of the width necessary to achieve cutoff of the $TM_{-1}$ $TE_{-1}$ modes, width w is selected to be equal to 0.52 µm. Again, this is close to a 50% duty cycle.

Figure 6:
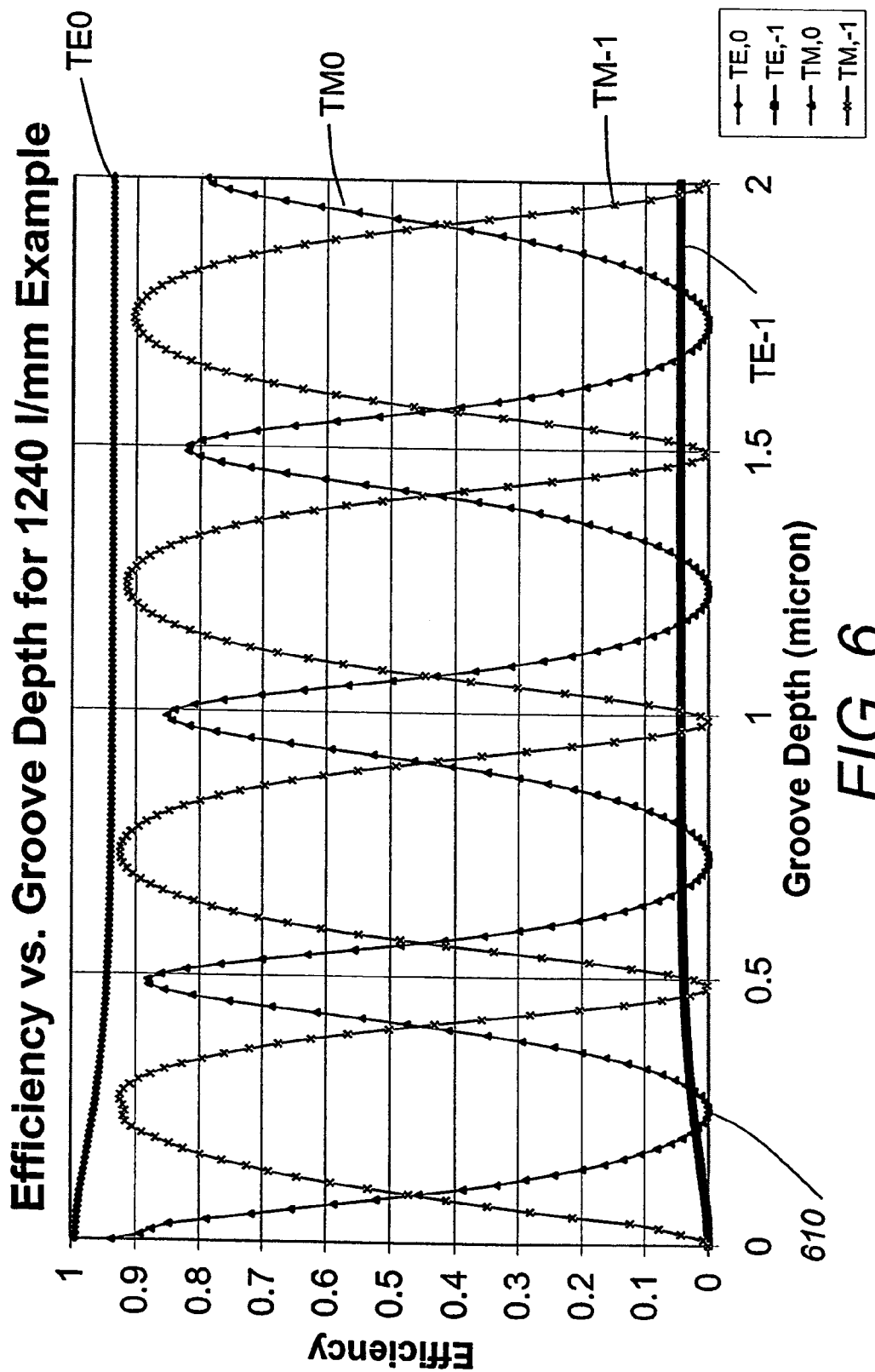
FIG. 6 is a graphical illustration of calculated values of $TM_0$ $TM_{-1}$ $TE_0$ $TE_{-1}$ as a function of groove depth for a grating having a frequency of 1220 lines/mm (with no overcoat layer)

FIG. 6 is a graphical illustration of calculated values of $TM_0$ $TM_{-1}$ $TE_0$ $TE_{-1}$ as a function of groove depth $h_1$ (with no overcoat layer). Because the reflective material and width w are the same as in Example 1, the efficiencies vs. groove depth, are very similar to those of Example 1.

In order to demonstrate that aspects of the present invention work with shallow grooves as well as deep ones, $1^{st}$ minimum 610 of TM-polarization transmission is selected (i.e., $h_1$=0.25 µm). At a depth equal to the $1^{st}$ minimum, the electric field of the TE-polarized field interacts with the bottoms of the grooves 150, so the TE-polarized light throughput efficiency is dependent on the depth $h_1$ of grooves 150.

Figure 7:
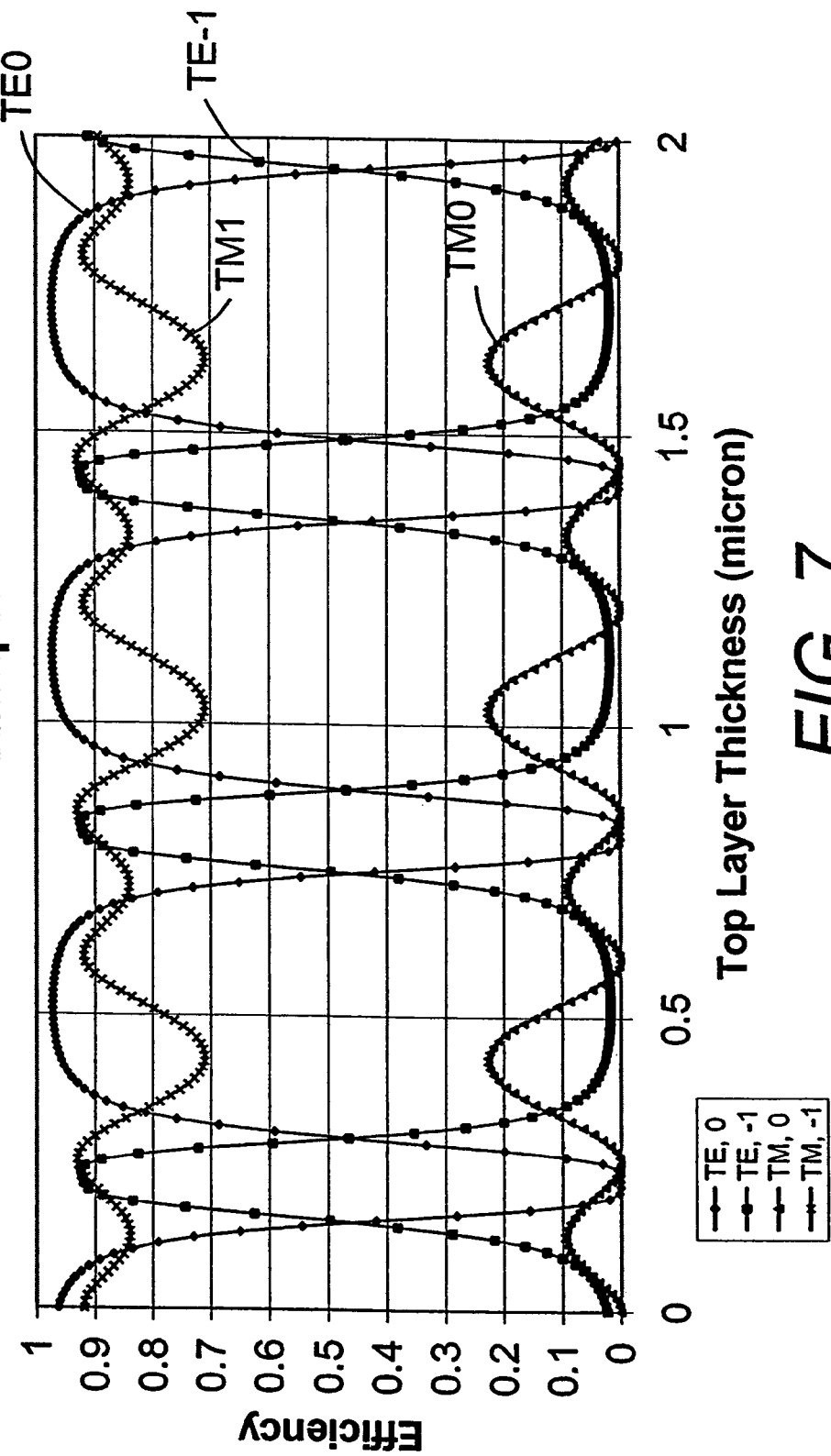
FIG. 7 is a graphical illustration of calculated values of $TM_0$ $TM_{-1}$ $TE_0$ $TE_{-1}$ as a function of the thickness of the overcoat layer for a grating having a frequency of 1220 lines/mm.

FIG. 7 is a graphical illustration of calculated values of $TM_0$ $TM_{-1}$ $TE_0$ $TE_{-1}$ as a function of the thickness $h_2$ of the overcoat layer. For the overcoat layer, it has been found that an index of $n_f$=1.60 yields good suppression of the zeroth diffraction order of the TE-polarized light. Accordingly, in the present exemplary embodiment of the invention, SiON was selected as the dielectric material. In contrast to Example #1, the diffraction efficiency of the TM-polarized light in this example varies between 0.75 and 0.98 as a function of the thickness $h_2$ of the overcoat layer due to operation at an angle of incidence that is further from the Brewster angle 58°. Accordingly, in Example #2, there is less flexibility in the choice of overcoat layer thickness $h_2$. A value of $h_2=0.23$ µm was selected.

Figure 8:
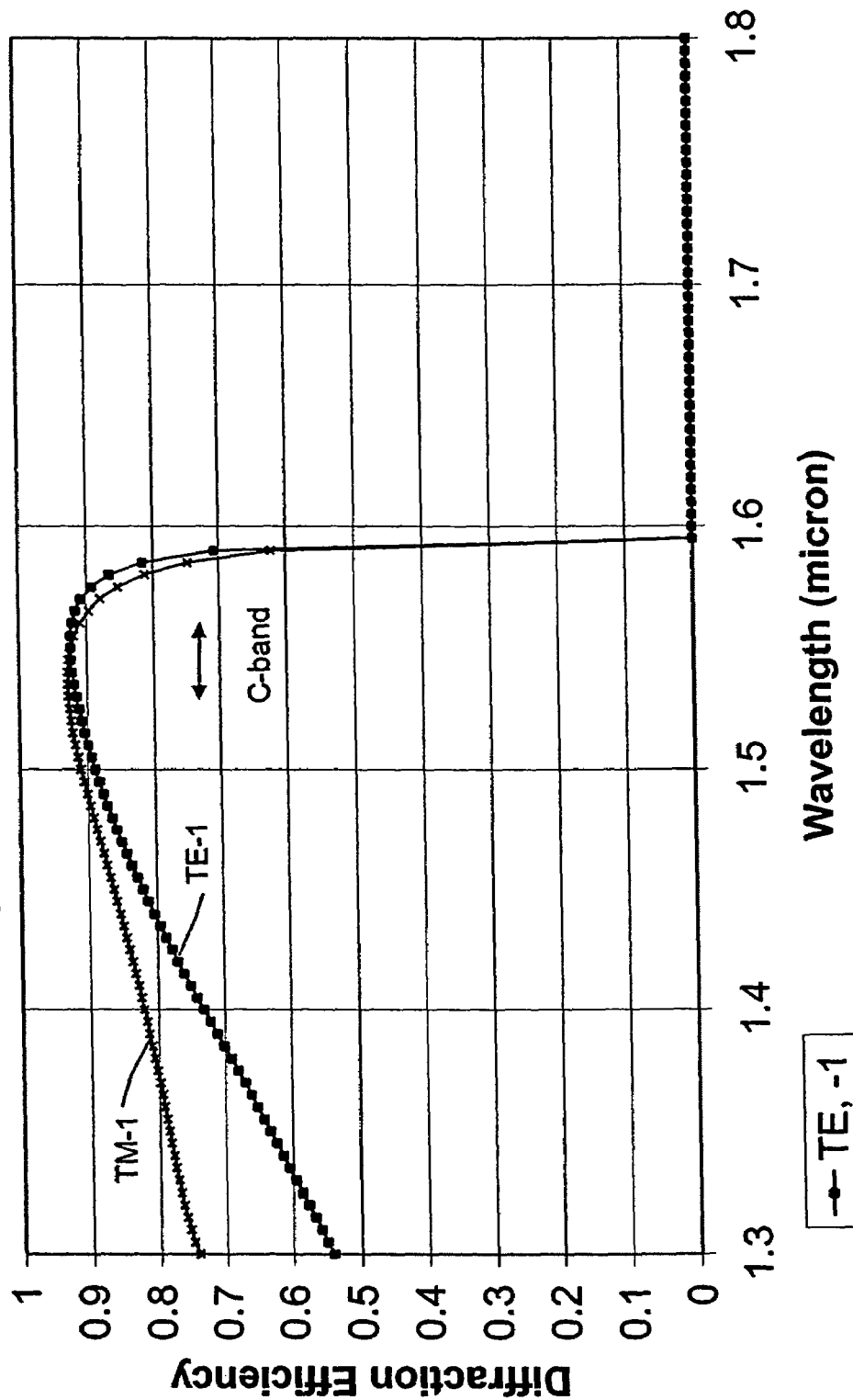
FIG. 8 is a graphical illustration of calculated throughput efficiency values as a function of wavelength for a grating made according to the values selected with reference to FIG. 6 and FIG. 7.

FIG. 8 is a graphical illustration of calculated throughput efficiency values as a function of wavelength for a grating made according to the values selected above with reference to FIG. 6 and FIG. 7. For each of the wavelengths in the C-band, the throughput efficiency of the minus-first diffraction order of TE-polarized light is 90% or better and the throughput efficiency of the minus-first diffraction order of TM-polarized light is 90% or better. The calculated maximum PDL in the C-band is below 0.2 dB.

FIGS. 9A–9F illustrate an exemplary, simplified process for producing gratings according to aspects of the present invention. In the illustrated process, a grating is produced in an upside down manner. That is, an overcoat layer 970 (shown in FIG. 9A; corresponding to overcoat layer 270 in FIG. 2) is deposited first, and an optional substrate 930 (shown in FIG. 9F; corresponding to substrate 130 in FIG. 2) is added last.

Figure 9A:
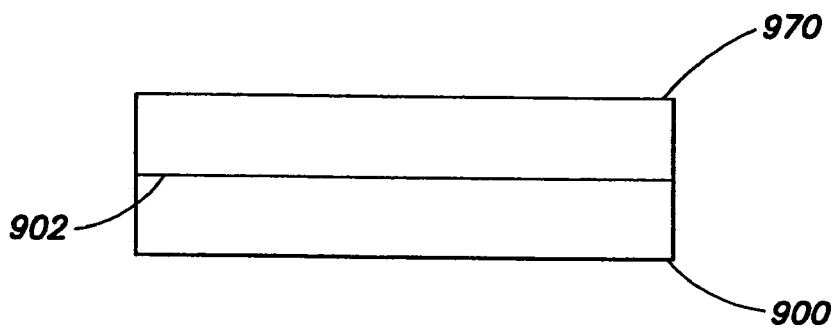
FIGS. 9A–9F illustrate an exemplary, simplified process for producing gratings according to aspects of the present invention.

In the step illustrated in FIG. 9A, a uniform dielectric layer 970 of aluminum oxide (corresponding to overcoat layer 270 in FIG. 2) is sputter deposited onto a platform 900. Platform 900 provides a surface onto which the grating is grown. Platform 900 preferably has a flat upper surface 902, and may be made of any suitable substance. Also, platform 900 is preferably easily released from layer 970, for example, using an etch process as described below. For example, the platform may be a standard silicon wafer that has a thermally-grown oxide layer at top surface 902.

Figure 9B:
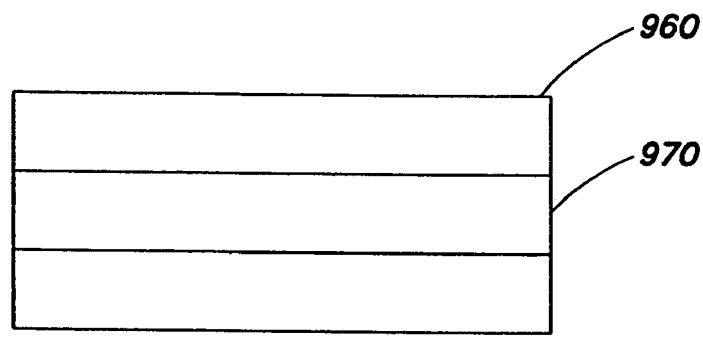
Figure 9C:
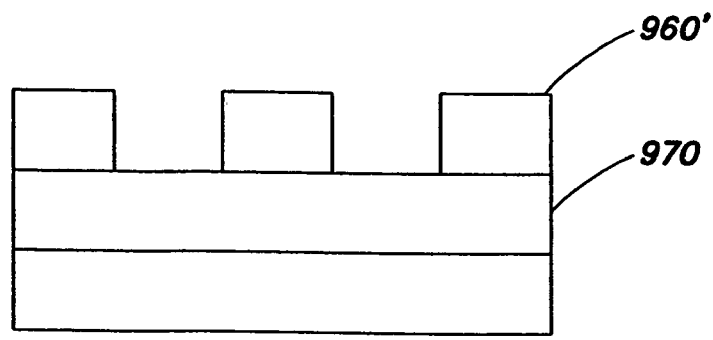

In the step illustrated in FIG. 9B, a layer 960 of silicon dioxide (corresponding to dielectric layer 160 in FIG. 2) is deposited onto layer 970. In the step illustrated in FIG. 9C, layer 960 is patterned using conventional etching techniques, to form a patterned layer 960'. For example, layer 960 may be patterned using a single contact mask or a holographic lithography technique.

Figure 9D:
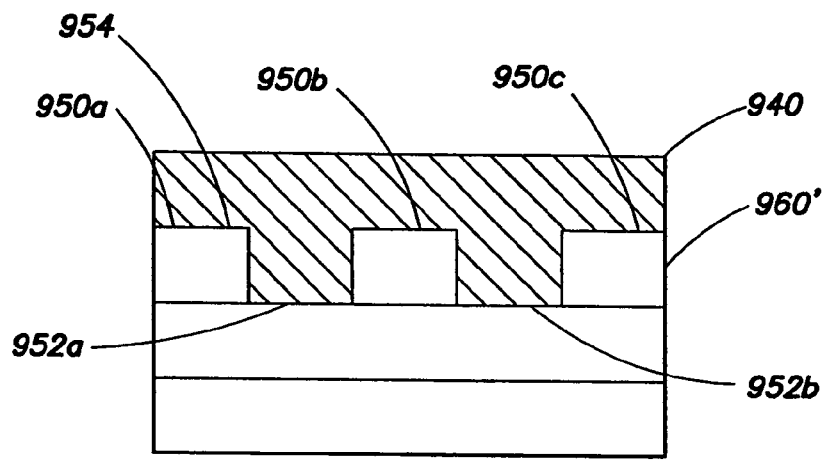

In the step illustrated in FIG. 9D, the pattered layer 960' is coated by sputter depositing a layer 940 of a reflective material (e.g., a layer of gold or metal; corresponding to reflective material 140 in FIG. 2) onto patterned layer 960' to form a reflective surface 954 comprising ridges 952a–952c and the grooves 950a–950b (corresponding to ridges 152 and grooves 150 in FIG. 2, respectively). In the illustrated embodiment, the patterned layer 960' fills the grooves 950a–952c. The result is that, the patterned layer 960' is an example of a non-conformal layer on a reflective surface (i.e., reflective surface 954).

Figure 9E:
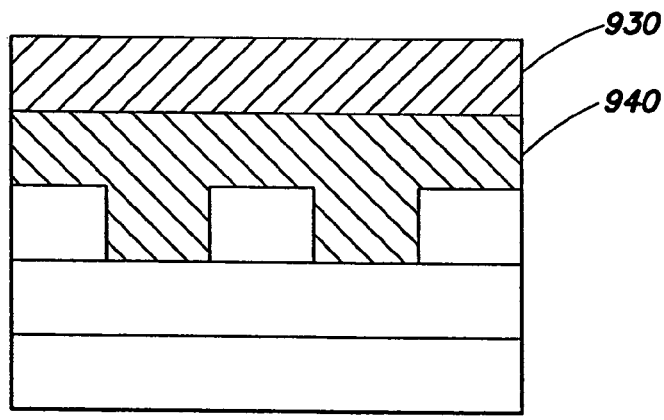

In an optional step, as illustrated in FIG. 9E, a substrate 930 (corresponding to substrate 130 in FIG. 2) is added onto layer 940. For example, the substrate may be made of fused silica or Zerodur™. Zerodur™ is manufactured by the Corning Corporation. The substrate may be attached to layer 940 using any suitable attachment technique, such as an adhesive. Preferably, the adhesive is thin to take advantage of the low thermal expansion of the substrate. For example, the adhesive may be an epoxy. Alternatively, a substrate may be metallized and then soldered to the grating structure.

Figure 9F:
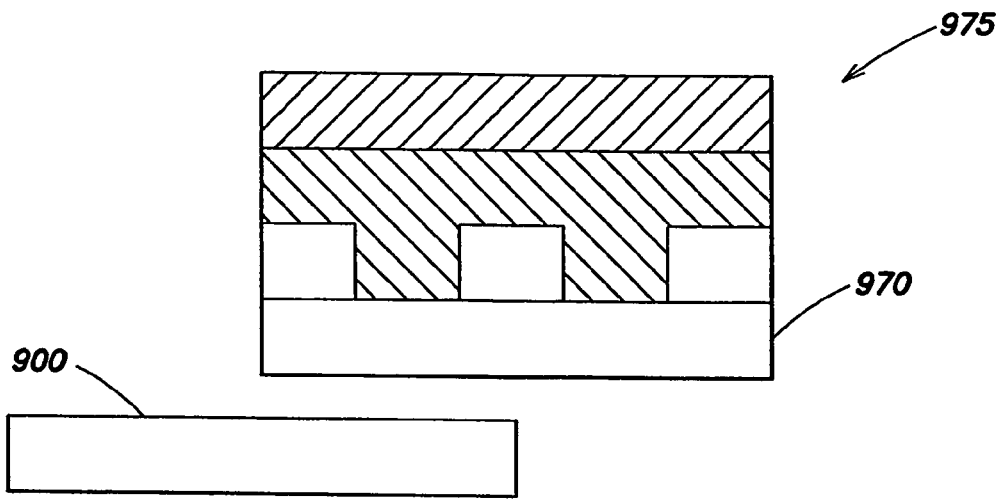

In the step illustrated in FIG. 9F, platform layer 900 is released from dielectric layer 970. For example, a standard etch technique for silicon of platform 900 may be used to remove the silicon, followed by a standard etch technique to remove the oxide layer that existed at top surface 902. The resultant structure 975 is a completed grating embodying at least some aspects of the present invention.

In another embodiment of the process, a grating is produced in an upside down in a manner similar to the process described above. However, dielectric layer 970 is deposited onto a suitably mechanically stable platform 900 that is suitably transparent at the wavelengths at which the resultant grating is to be used. In some embodiments, the stability provided by the platform may eliminate a need for a substrate. Furthermore, because the platform is suitably transparent, there is no need to remove the platform prior to use of the resulting grating. For example, in this embodiment the platform may comprise any suitable dielectric material, such as quartz.

It is to be appreciated that while the above methods of manufacture describe manufacturing diffraction gratings in a upside down manner, a diffraction grating according to aspects of the present invention may be made in which the diffraction grating is grown in a right side up manner, for example, in some embodiments that would mean that an overcoat layer is deposited last. Additionally, while the manufacture of a lamellar grating is illustrated any suitable lithographic or non-lithographic techniques may be used to manufacture a non-lamellar grating.

Having thus described the inventive concepts and a number of exemplary embodiments, it will be apparent to those skilled in the art that the invention may be implemented in various ways, and that modifications and improvements will readily occur to such persons. Thus, the embodiments are not intended to be limiting and are presented by way of example only. The invention is limited only as required by the following claims and equivalents thereto.

What is claimed is:

1. A reflective diffraction grating for processing electromagnetic radiation, the radiation having a wavelength $\lambda$ and a TM-polarized portion, comprising:
   a substantially reflective surface comprising a plurality of grooves each having a width aligned in a first direction, and a plurality of ridges each having a width aligned in the first direction, the grooves and ridges being alternately disposed along the surface, and each of the grooves being adapted to propagate and reflect a waveguided portion of the TM-polarized portion of the radiation, and each of the grooves being adapted to provide a phase delay to the guided portion of the TM-polarized portion of the radiation, relative to a non-guided portion of the TM-polarized portion of the radiation reflected by the ridges, such that the zeroth diffraction order of the TM-polarized portion of the radiation is substantially canceled by destructive interference;
   a dielectric material having an index of refraction disposed on at least a portion of the reflective surface; and
   an overcoat layer disposed on the dielectric material having an index of refraction equal $n_o$.

2. The reflective diffraction grating of claim 1, wherein a depth of each of the grooves is equal to about $(2k+1)\lambda/4$, where k is an integer.

3. The reflective diffraction grating of claim 1, wherein the dielectric material is non-conformally disposed on the reflective surface.

4. The reflective diffraction grating of claim 3, wherein a thickness of the dielectric material in the grooves is greater than a thickness of the dielectric material on the ridges.

5. The reflective diffraction grating of claim 3, wherein the dielectric material fills the grooves.

6. The reflective diffraction grating of claim 5, wherein the diffraction grating is lamellar, whereby a top surface of the dielectric material is in a same plane with the ridges.

7. The reflective diffraction grating of claim 5, wherein the dielectric material covers the ridges.

8. The reflective diffraction grating of claim 1, wherein the radiation comprises a TE-polarized portion and wherein the overcoat layer is selected to have a thickness to impart a phase delay between a portion of the radiation reflected from a top surface of the overcoat layer relative to a portion of the radiation reflected from the ridges, the phase delay selected such that the zeroth diffraction order of the TE-polarized portion is substantially canceled by destructive interference.

9. The reflective diffraction grating of claim 8, wherein the throughput efficiency of the reflective surface is greater than 85% for both the TM-polarized portion and the TE-polarized portion.

10. The reflective diffraction grating of claim 1, wherein the overcoat layer has a thickness equal to about $(2k+1)\lambda/4 n_o$, where k is an integer.

11. The reflective diffraction grating of claim 1, wherein the overcoat layer has an index of refraction that is different than the index of refraction of the dielectric material.

12. The reflective diffraction grating of claim 1, wherein the dielectric material and the overcoat layer are made of the same material.

13. The reflective diffraction grating of claim 1, wherein the diffraction grating is lamellar.

14. The reflective diffraction grating of claim 1, wherein a cross sectional shape of the grooves is one of sinusoidal, trapezoidal and sawtooth.

15. The reflective diffraction grating of claim 1, wherein the reflective material is conductive.

16. The reflective diffraction grating of claim 15, wherein the reflective material is a metal.

17. The reflective diffraction grating of claim 16, wherein the metal is gold.

18. The reflective diffraction grating of claim 1, wherein the dielectric material is one of $Al_2O_3$ and $SiO_2$.

19. The reflective diffraction grating of claim 1, wherein the grating has a duty cycle of about 50%.

20. The reflective diffraction grating of claim 1, wherein the reflective surface is disposed on a substrate.

21. The reflective diffraction grating of claim 1, wherein the grooves are configured to transmit substantially only a $TM_0$ mode of the radiation.

22. The reflective diffraction grating of claim 1, wherein the grooves are configured to transmit a $TM_0$ mode and a $TM_1$ mode of the radiation.

23. A reflective diffraction grating for processing electromagnetic radiation, the radiation having a wavelength $\lambda$ and a TM-polarized portion, comprising:
a substantially reflective surface comprising a plurality of grooves each having a width aligned in a first direction, and a plurality of ridges each having a width aligned in the first direction, the grooves and ridges being alternately disposed along the surface, and each of the grooves being adapted to propagate and reflect a waveguided portion of the TM-polarized portion of the radiation, and each of the grooves being adapted to provide a phase delay to the guided portion of the TM-polarized portion of the radiation, relative to a non-guided portion of the TM-polarized portion of the radiation reflected by the ridges, the phase delay being about equal to $(2k+1)\lambda/2$, where k is an integer; and
a dielectric material having an index of refraction disposed on at least a portion of the reflective surface;
wherein the dielectric material fills the grooves, and the diffraction grating is lamellar, whereby a top surface of the dielectric material is in a same plane with the ridges.

24. The reflective diffraction grating of claim 23, wherein the dielectric material is non-conformally disposed on the reflective surface.

25. The reflective diffraction grating of claim 23, further comprising an overcoat layer disposed on the dielectric material having an index of refraction equal to $n_o$.

26. The reflective diffraction grating of claim 25, wherein the radiation comprises a TE-polarized portion and wherein the overcoat layer is selected to have a thickness to impart a phase delay between a portion of the radiation reflected from a top surface of the overcoat layer relative to a portion of the radiation reflected from the ridges, the phase delay being equal to about $(2k+1)\lambda/2$, where k is an integer.

27. The reflective diffraction grating of claim 26, wherein the throughput efficiency of the reflective surface is greater than 85% for both the TM-polarized portion and the TE-polarized portion.

28. The reflective diffraction grating of claim 25, wherein the overcoat layer has an index of refraction that is different than the index of refraction of the dielectric material.

29. The reflective diffraction grating of claim 25, wherein the dielectric material and the overcoat layer are made of the same material.

30. The reflective diffraction grating of claim 23, wherein the reflective material is conductive.

31. The reflective diffraction grating of claim 30, wherein the reflective material is a metal.

32. The reflective diffraction grating of claim 31, wherein the metal is gold.

33. The reflective diffraction grating of claim 23, wherein the dielectric material is one of $Al_2O_3$ and $SiO_2$.

34. The reflective diffraction grating of claim 23, wherein the grating has a duty cycle of about 50%.

35. The reflective diffraction grating of claim 23, wherein the reflective surface is disposed on a substrate.

36. The reflective diffraction grating of claim 23, wherein the grooves are configured to transmit substantially only a $TM_0$ mode of the radiation.

37. The reflective diffraction grating of claim 23, wherein the grooves are configured to transmit a $TM_0$ mode and a $TM_1$ mode of the radiation.

38. The reflective diffraction grating of claim 23, wherein the a depth of each of the grooves is about equal to $(2k+1)\lambda/4$, where k is an integer.

39. A diffractive grating system, comprising:
an electromagnetic radiation source arranged to project radiation onto a substantially reflective surface, the radiation comprising at least one wavelength $\lambda$ and a TM-polarized portion; and
the substantially reflective surface comprising a plurality of grooves each having a width aligned in a first direction, and a plurality of ridges each having a width aligned in the first direction, the grooves and ridges being alternately disposed along the surface, and each of the grooves being adapted to propagate and reflect a guided portion of the TM-polarized portion of the radiation, and each of the grooves adapted to provide a phase delay to the guided portion of the TM-polarized portion of the radiation, relative to a non-guided portion of the TM-polarized radiation reflected by the ridges, the phase delay being about equal to $(2k+1)\lambda/2$, where k is an integer;
a dielectric material having an index of refraction $n_g$ disposed on at least a portion of the reflective surface; and
an overcoat layer disposed on the dielectric layer having an index of refraction equal to $n_o$.

40. The reflective diffraction grating of claim 39, wherein a depth of each of the grooves is equal to about $(2k+1)\lambda/4$, where k is an integer.

41. The diffractive grating system of claim 39, wherein the width of each of the grooves is less than $\lambda/(2n_g)$.

42. The diffractive grating system of claim 41, wherein the width of each of the grooves is less than 80% of $\lambda/(2n_g)$.

43. The diffractive grating system of claim 39, wherein the radiation comprises a band of wavelengths and $\lambda$ is located approximately at the center of the band of wavelengths.

44. The diffractive grating system of claim 39, wherein the dielectric material is non-comformally disposed on the reflective surface.

45. The reflective diffraction grating of claim 39, wherein the radiation comprises a TE-polarized portion and wherein the overcoat layer is selected to have a thickness to impart a phase delay between a portion of the radiation reflected from a top surface of the overcoat layer relative to a portion of the radiation reflected from the ridges, the phase delay selected such that the zeroth diffraction order of the TE-polarized portion is substantially canceled by destructive interference.

46. The reflective diffraction grating of claim 45, wherein the overcoat layer has a thickness equal to about $(2k+1)\lambda/4 n_o$, where k is an integer.

47. The diffractive grating system of claim 45, wherein the throughput efficiency of the reflective surface is greater than 85% for both the TM-polarized portion and the TE-polarized portion.

48. The reflective diffraction grating of claim 39, wherein the overcoat layer and the dielectric material and the overcoat layer are made of the same material.

49. The reflective diffraction grating of claim 39, wherein the radiation source is configured to project radiation onto a top surface of the overcoat layer at approximately a Brewster's angle.

50. The diffractive grating system of claim 39, wherein the grating is lamellar.

51. The diffractive grating system of claim 39, wherein a cross section shape of the grooves is one of sinusoidal, trapezoidal and sawtooth.

52. The diffractive grating system of claim 39, wherein the reflective material is conductive.

53. The diffractive grating system of claim 52, wherein the reflective material is a metal.

54. The diffractive grating system of claim 53, wherein the metal is gold.

55. The diffractive grating system of claim 39, wherein the dielectric material is one of $Al_2O_3$ and $SiO_2$.

56. The diffractive grating system of claim 39, wherein the dielectric material is thicker in the grooves than on the ridges.

57. The diffractive grating system of claim 56, wherein the dielectric material covers the ridges.

58. The diffractive grating system of claim 39, wherein the grating has a duty cycle of about 50%.

59. The diffractive grating system of claim 39, wherein the reflective surface is disposed on a substrate.

60. The diffractive grating system of claim 39, wherein the radiation source comprises a laser.

61. The diffractive grating system of claim 39, wherein the radiation source is an optical fiber.

62. The diffractive grating system of claim 39, wherein the radiation is in the C-band.

63. The diffractive grating system of claim 39, further comprising a polarization filter disposed between the radiation source and the reflective surface adapted to selectively transmit the TM-polarized portion of the radiation.

64. The diffractive grating system of claim 39, wherein the grating has a single grating period.

65. The diffractive grating system of claim 39, wherein the radiation source is configured to project radiation onto the reflective surface at approximately a Littrow angle.

66. The diffractive grating system of claim 39, wherein the source and the reflective surface are configured and arranged such that only the minus first order and the zeroth diffraction order are reflected by the reflective surface.

67. The diffractive grating system of claim 39, wherein the grooves are configured to transmit substantially only a $TM_0$ mode.

68. The diffractive grating system of claim 39, wherein the grooves are configured to transmit a $TM_0$ mode and a $TM_1$ mode of the radiation.

69. A method of processing radiation comprising a wavelength $\lambda$, a TE-polarized portion and a TM-polarized portion, comprising:

projecting the radiation from a source onto a reflective diffraction grating comprising a plurality of grooves and a plurality of ridges, the grooves and the ridges being alternately disposed;

reflecting a first portion of the radiation from the ridges;

waveguiding a second portion of the radiation in the grooves;

reflecting the second portion of the radiation such that the act of reflecting the first portion and the act of waveguiding the second portion combine to impart a first phase difference between the first portion and the second portion equal to an odd multiple of 180 degrees;

projecting the radiation onto an overcoat layer disposed on the reflective diffraction grating and having a top surface, at least the first portion and the second portion of the radiation propagating through the overcoat layer; and reflecting a third portion of the radiation from the top surface of the overcoat layer to impart a second phase difference between the first portion of radiation and the third portion of radiation, wherein the second phase difference is equal to an odd multiple of 180 degrees.

70. The method of processing radiation of claim 69, wherein the second portion of radiation includes only radiation in the $TM_0$ mode.

71. The method of processing radiation of claim 69, wherein the act of reflecting the first portion and the act of reflecting the second portion combine to cause the zeroth diffraction order of the TM-polarized portion of the radiation to be substantially canceled.

72. The method of processing radiation of claim 69, wherein the step of projecting radiation comprises projecting radiation in the C-band.

73. The method of processing radiation of claim 69, wherein the step of waveguiding the second portion of the radiation includes projecting the radiation through a first dielectric material having an index $n_g$ that is disposed in the grooves.

74. The method of processing radiation of claim 69, wherein the second phase difference being such that the zeroth diffraction order of the TE-polarized portion is substantially completely canceled by destructive interference.

75. The method of processing radiation of claim 69, wherein the step of projecting the radiation through the overcoat layer includes projecting radiation onto the overcoat layer at approximately a Brewster's angle.

76. The method of processing radiation of claim 69, wherein the step of projecting radiation from the source comprises projecting radiation from a laser source.

77. The method of processing radiation of claim 69, wherein the step of projecting radiation from the source comprises projecting radiation from an optical fiber.

78. The method of processing radiation of claim 69, wherein the step of projecting radiation comprises projecting the radiation onto the diffraction grating at a Littrow angle.

79. The method of processing radiation of claim 69, wherein the step of projecting radiation from the source onto the diffraction grating includes projecting the radiation with respect to the diffraction grating so as to preclude all but the minus-first order and the zeroth diffraction order.

\* \* \* \* \*